US 8,266,032 B1
Sep. 11, 2012

(12) United States Patent
Nathanson

(10) Patent No.: US 8,266,032 B1
(45) Date of Patent: *Sep. 11, 2012

(54) SYSTEM AND METHOD FOR AN AUTOMATED SALES SYSTEM WITH REMOTE NEGOTIATION AND POST-SALE VERIFICATION

(76) Inventor: Joshua David Nathanson, Freeport, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/068,452

(22) Filed: May 11, 2011

Related U.S. Application Data

(60) Continuation of application No. 12/932,851, filed on Mar. 8, 2011, now Pat. No. 8,170,937, which is a division of application No. 10/876,675, filed on Jun. 28, 2004, now Pat. No. 7,917,414.

(51) Int. Cl.
*G06Q 30/00* (2012.01)
(52) U.S. Cl. .................................. 705/35; 705/26.4
(58) Field of Classification Search ............. 705/35–45
See application file for complete search history.

(56) References Cited

U.S. PATENT DOCUMENTS

| | | | | |
|---|---|---|---|---|
| 6,151,589 A * | 11/2000 | Aggarwal et al. | ......... | 705/36 R |
| 6,243,691 B1 * | 6/2001 | Fisher et al. | ......... | 705/37 |
| 7,200,570 B1 * | 4/2007 | Wu | ......... | 705/37 |
| 7,315,832 B2 * | 1/2008 | Bauer et al. | ......... | 705/26.3 |
| 7,461,024 B2 * | 12/2008 | Montgomery | ......... | 705/37 |
| 7,555,445 B2 * | 6/2009 | Moya et al. | ......... | 705/26.3 |
| 7,702,540 B1 * | 4/2010 | Woolston | ......... | 705/26.3 |
| 2002/0013761 A1 * | 1/2002 | Bundy et al. | ......... | 705/37 |
| 2002/0065758 A1 * | 5/2002 | Henley | ......... | 705/37 |
| 2002/0083016 A1 * | 6/2002 | Dittrich et al. | ......... | 705/80 |
| 2002/0120552 A1 * | 8/2002 | Grey et al. | ......... | 705/37 |
| 2002/0178127 A1 * | 11/2002 | Byde et al. | ......... | 705/80 |
| 2003/0028469 A1 * | 2/2003 | Bergman et al. | ......... | 705/37 |
| 2003/0130932 A1 * | 7/2003 | Wong | ......... | 705/37 |
| 2003/0195838 A1 * | 10/2003 | Henley | ......... | 705/37 |
| 2005/0108144 A1 * | 5/2005 | Longman et al. | ......... | 705/37 |
| 2005/0131797 A1 * | 6/2005 | Ananthanarayanan et al. | ......... | 705/37 |
| 2005/0182660 A1 * | 8/2005 | Henley | ......... | 705/2 |
| 2005/0262005 A1 * | 11/2005 | Woolston | ......... | 705/37 |
| 2009/0043685 A1 * | 2/2009 | Benjamin et al. | ......... | 705/37 |
| 2009/0089216 A1 * | 4/2009 | Srivastava et al. | ......... | 705/80 |

OTHER PUBLICATIONS

"BargainandHaggle.com Announces Site Enhancements", PR Newswire, Dec. 5, 2001, pp. 1-2.*
"Nacomex, The National Computer Exchange Moves Its Trading Floor to the Internet; Direct Negotiations for Sale of New & Used Computers", PRNewswire, Jan. 20, 1998, p. 1.*
Business Editors & High Tech Writers, "Lycos Network Launches Internet's First Personal Homepage Auctions", Business Wire. New York: Jul. 12, 1999. p. 1.*

* cited by examiner

*Primary Examiner* — Ella Colbert
*Assistant Examiner* — Mohammad Z Shaikh
(74) *Attorney, Agent, or Firm* — Van Dyke Law; Raymond Van Dyke

(57) ABSTRACT

The present invention provides a system and method to process items for sale or bid, to transmit electronic negotiations between prospective buyer and seller, and to verify the condition of the item before delivery to the buyer. The invention facilitates autonomous and remote negotiation between sellers and prospective buyers while protecting buyers from fraud and item misrepresentation. With the present invention, items can be sold individually and are not treated as standardized items that are interchangeable with similar commodity goods. The present invention also provides a waitlisting function. In addition, the functionality of traditional auction systems may be integrated with the novel features of the present invention. Furthermore, the present invention provides a system and method for conducting a reverse auction by allowing prospective buyers to list desired items.

59 Claims, 15 Drawing Sheets

SYSTEM AND METHOD FOR AN AUTOMATED SALES SYSTEM WITH REMOTE NEGOTIATION AND POST-SALE VERIFICATION

CROSS REFERENCE TO RELATED APPLICATION

The present invention is a continuation of and claims priority from U.S. patent application Ser. No. 12/932,851, filed Mar. 8, 2011, which is a divisional of U.S. patent application Ser. No. 10/876,675, filed Jun. 28, 2004, now U.S. Pat. No. 7,917,414, both entitled "System and Method for an Automated Sales System With Remote Negotiation and Post-Sale Verification," the subject matters of which are incorporated by reference herein.

BACKGROUND OF THE INVENTION

1. Field of the Invention

The present invention relates to systems and methods of executing a remote negotiation for sale and post-sale verification of goods or services on an automated exchange or electronic system, particularly with respect to Internet commerce.

2. Description of Related Art

In traditional buyer and seller negotiation of collectibles, such as comic books, baseball cards, and the like, buyers find sellers of desired items through the distribution of catalogs or paper advertisements. Negotiation on price traditionally requires that letters, faxes or telephone calls be exchanged between a seller and prospective buyers. When an offer is made for an item, an entire round of communications is required where prospective buyer and seller go back and forth with offer and counteroffer until they settle upon an agreed price. Some advances in communications have made this process more manageable. Prospective buyers can search for sellers through Internet web sites, and they generally communicate with a seller via e-mail. This method, however, is, at best, cumbersome. Furthermore, this approach does not allow buyer and seller negotiations to occur in real-time where sellers can systematically evaluate bids rapidly upon submittal.

A recent innovation in sales has been to use the Internet to post items on third-party auction or listing web sites. These sites allow users to bid for goods and services in an auction or to purchase goods and services at listed prices. These systems are automated and capable of accepting a bid from a customer through e-mail, telephone, facsimile, mail, or through an online form. Bidding information is taken by the system and placed into a bid database, and a winner is selected based on the bid.

Auction or listing systems allow negotiation for items by one of two methods. One method provides buyer and seller autonomy. Sellers do everything involved with the sales process, from listing and describing the item on the site to sending the item to the buyer after payment is received. This method gives a substantial amount of flexibility for buyer and seller. However, buyers of items over the Internet frequently complain that after sending payments to unknown Internet auction and direct sellers they receive defective or misrepresented merchandise or receive nothing at all.

The second method is for the owner of the merchandise to agree to a reserve price with an auction house or third party site and to send the item in advance to the third party to sell on consignment. After the item is received and the third-party has physical possession, it does everything in the auction or sales process. This system offers less autonomy for the seller in the sales process, but is more secure for the buyer because a third party verifies the item prior to advertising it in the auction. It also enables the company to act as third party arbitrator for any disputes that may arise. This second method increases the likelihood of a smooth post-sale transaction and increased likelihood of buyer satisfaction.

Security brokerage firms for years have used automated transaction systems for matching buy and sell orders for securities. For example, NASDAQ's SOES (Small Order Execution System) system offers complete electronic matching of buyers and sellers. However, this system does not facilitate back and forth negotiations between individual buyers and sellers on unique, individual items. It merely pairs buy orders with sell orders of a standardized commodity when the pricing criteria of both sides of the trade are met. Similarly, a system has been developed in which similar collectibles trade as a single commodity on a collectible exchange much like the stock market. There is a set sell price and a set buy price. The item sold is a standardized commodity which is interchangeable with other items sharing the same description. Prospective buyers or bidders cannot choose a unique item for purchase. For example, a Barry Bonds 1987 Fleer baseball card in a particular condition may be listed on a site. Though many such cards are available, only one Barry Bonds card is pictured and users cannot choose the exact card for purchase. There are frequently differences in the quality of similar items, and bidders prefer to see the exact item upon which they are bidding. When a buy order price matches a sell order price, a standardized item is sent to the third party exchange that in turn sends it to the buyer. While verification of the merchandise may occur, only certain specifications are verified. The buyer receives a standardized item that matches the specifications that they request. These exchanges do not enable negotiation between an individual buyer and seller. Individual offers are not relayed to sellers of items so sellers are unable to respond to buyer activity. Likewise, bidders are not able to respond to seller activity. It is also not possible for a seller to submit a counteroffer in response to a bid, and for the two to negotiate back and forth.

SUMMARY OF THE INVENTION

Currently, no automated sales system allows buyers and sellers to negotiate autonomously and remotely for non-standardized and unique goods while also providing verification of the goods after a sales agreement.

To resolve the absence of such a system, the present invention provides a system and method to integrate a seller-managed listing process and negotiation functionality with full-service verification of each item upon sale. Items can be sold individually and are not treated as standardized items that are interchangeable with similar goods. Prospective buyers and sellers have freedom to negotiate on items regarding terms of sale, such as price, while simultaneously protecting buyers from fraud and item misrepresentation. Unlike systems that sell on consignment, the seller is able to maintain possession of the merchandise at all times prior to successful negotiation between buyer and seller. In addition, the buyer does not have to be concerned about seller fraud or item misrepresentation because a third party ensures post-sale item verification of merchandise prior to shipment of the item to the buyer.

The present invention provides a system and method to process items for sale or bid, to transmit electronic negotiations between buyer and seller within a specified time period, and to verify the item before delivery to the buyer. It also provides a system and method to securely receive bids electronically from a number of bidders, to rank the received bids using a variety of criteria, and to electronically provide resulting information to bidders and sellers. The present invention also provides a system and method for conducting a reverse auction by allowing prospective buyers to list desired items in a wantlist.

In a particular embodiment of the present invention, sellers use software to add items to the web site themselves. If there is an item that an interested bidder thinks is priced too high, the bidder can submit a bid (an offer to the seller to purchase the item at a specified price). The seller can then accept the offer, decline the offer, or make a counteroffer. The counteroffer allows the seller to offer the item to the bidder for a price greater than the bid, but less than the seller's initially listed asking price. Within a counteroffer time limit, if any bid below the counteroffer price is subsequently submitted by another bidder, the counteroffer previously submitted by the seller will automatically be relayed to that bidder. Within the counteroffer time limit, if any bid is subsequently submitted by another bidder at or above the counteroffer price, the bid is automatically accepted for the seller by the system. At the time of counteroffer submission, the seller can also simultaneously change the listed asking price to the counteroffer price in order to make the item immediately available at the counteroffer price for other buyers.

Additionally, the present invention may allow a bidder to submit a bid that is higher than the seller's ask price before the seller accepts another offer at the ask price. In this case, the seller may manually accept the higher bid. Alternatively, the seller may wish to submit a counteroffer at a price higher than the original ask price and the bid, which the bidder may accept to prevent a chance that other bidders may secure the item. If the time limit has expired and the seller has not responded to the higher offer, the system may automatically accept the highest bid at or above the ask price.

When a buyer and seller agree on price, there is a match and the item is sent by the seller to a third party that verifies the accuracy of the product description. In a particular embodiment, the item may be a collectible comic book, and the verification confirms that the comic book has the condition, quality, and characteristics given in the seller's description of the comic book. The buyer sends payment. After verification and receipt of payment, the item is sent to the buyer. Delivery of the item may include postal shipment, express shipment, courier, will call pick-up, or the like. Payment is also sent to the seller. Payment forms may include a bank check, credit card, debit card, wire transfer, any electronic system of funds transfer, or the like. Payment may be direct or indirect, i.e., payment to another trusted party such as a bank. The sale may be deemed to be complete upon receipt of item by the buyer, or the buyer may have a time period to accept or decline the item according to the return policy.

The invention may also combine user submissions of buy orders and bids into one order for buyer submission, transaction processing, payment, shipment, and receipt making it highly convenient for the buyer. The system enables a buyer to place one order containing buy orders and bids for multiple items owned by multiple sellers. After negotiations between the buyer and each seller cease for each item or after the order timeout period set in the system (whichever is sooner), buyer receives one final order confirmation and payment request for all items within the order. Buyer sends out one payment for the order to one place, instead of sending multiple payments out to each seller. Buyer receives one package for all items within the order instead of multiple packages from each seller.

The functionality of traditional auction systems may be integrated with the novel features of the present invention. When the seller lists the item, the seller specifies a list price if the item does not sell at auction. If the item does not sell at auction (the auction price is not greater than or equal to the seller's start price or reserve price), the program automatically lists the unsold item for sale (rather than auction) at a list price specified by the seller. Additionally, although the seller lists the item remotely and independently of an auction administrator, if the item sells at auction, the seller ships the item for third party verification. Prior to shipping the item to the buyer (the high bidder), the third party administrator verifies that it fits the description and condition specified at auction.

DETAILED DESCRIPTION OF THE INVENTION

Figure 1:
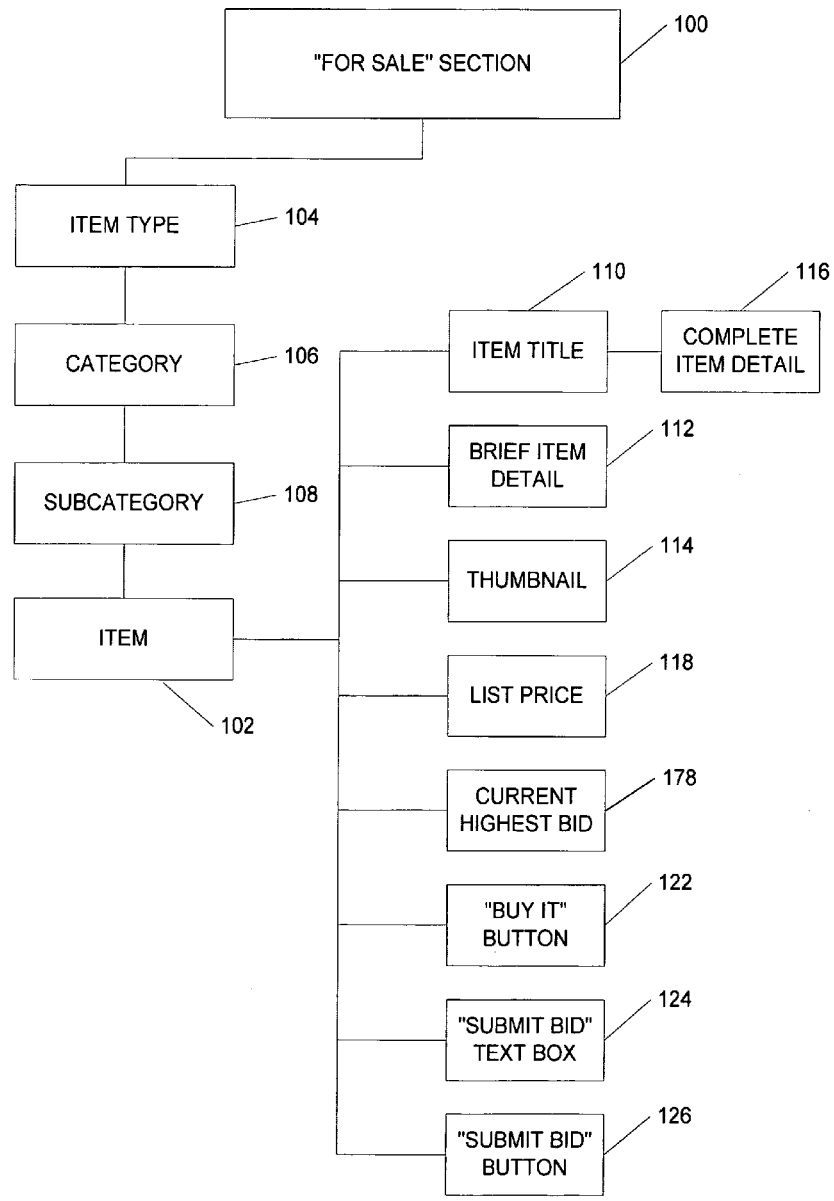
FIG. 1 is an organizational chart of a "For Sale" section user interface displaying items for sale or bid.

The following presents a detailed description of an automated sales system that integrates a seller-managed listing process and online negotiation functionality with full-service verification of each item upon sale. Items can be sold individually and are not treated as standardized items that are interchangeable with similar goods.

The present invention may be executed on an automated exchange or electronic system, which may be a single computer station, a number of computer stations, personal digital assistants, cell phones, the Internet, or any device capable of displaying a graphical interface or web based media. The system organizes data in a predetermined format and may display the information on any device capable of displaying information to a user. The system communicates data with the user in any available manner, including, but not limited to, over-the-air (wireless), cable, satellite, telephone, DSL (Digital Subscriber Line), LAN (Local Area Network), WAN (Wide Area Network), Intranet, or the Internet. Furthermore, any notification between the system and a user may occur in any available manner, including, but not limited to, email, paging, voice messaging, or text messaging.

The present invention may be implemented as computer software on a conventional computer system. The steps of the present invention may be executed as machine-executable instructions that program a general-purpose or special-purpose processor to perform the steps of the present invention. Alternatively, the steps of the present invention might be performed by specific hardware components with hardwired logic for performing the steps, or by any combination of programmed computer components and custom hardware components, as is understood to those skilled in the art.

The present invention may also be provided as a computer program product that may include a machine-readable medium having stored instructions, which may be used to program a computer (or other electronic devices) to perform the steps of the present invention. The machine-readable medium may include, but is not limited to, floppy diskettes, optical disks, CD-ROMs, magnet-optical disks, ROMs, RAMs, EPROMs, EEPROMs, magnet or optical cards, or other type of media/machine-readable medium suitable for storing electronic instructions. The present invention may also be downloaded as a computer program product, where the program may be transferred from a remote computer to a requesting computer using data signals embodied in a carrier wave or other propagation medium via a communication link.

The preferred embodiment of the present invention facilitates the negotiation and exchange of items via data presented and exchanged over the Internet. While embodiments of the present invention will be described with respect to an online listing or auction trading environment, the systems and methods described are equally relevant to other applications in which data is collected from various sources and presented to a user and/or other e-commerce environments.

A web site with an embodiment of the present invention may be comprised of a "For Sale" section and an "Auction" section. The "For Sale" section allows a seller to list items with a desired list price. The buyer may purchase the item at the list price or try to negotiate terms of sale with the seller by offering a bid. The seller may counteroffer and negotiate with buyers on a one-on-one basis. The "Auction" section allows a seller to list an item for open auction and the item is sold to the highest bidder. An administrator of the web site, also known as a negotiation administrator, may facilitate the steps of the present invention by ensuring that negotiations and sales comply with general rules, which may include rules governing user permissions for sellers or buyers on the web site, guidelines covering allowable descriptions for sale items, as well as other rules described hereinbelow.

"For Sale" Section

With reference now to FIG. 1 of the Drawings, there is illustrated an organizational chart of a "For Sale" section, designated generally herein by the reference numeral 100. As shown in the figure, sellers can list items 102 according to item types 104, categories 106, and subcategories 108. Items 102 include detailed data regarding the item's title 110, brief item details 112, and a pictorial thumbnail scan 114 of the item. For complete item description, a hyperlink connects item title 110 to a full item detail page 116. Additional item detail includes a seller's ask or list price 118 and the current highest bid 178. To control the items that are available on the web site and as a first step in verifying sale items, an administrator of the web site may restrict the subcategories to subcategories of items that can be verified.

When a buy order is created, i.e., a user selects to purchase the aforementioned item 102 at the seller's list price 118, users initiate this by clicking a "Buy It" button 122. When a bid is created, i.e., a user makes an offer below the seller's list price 118, the user indicates such by entering the bid in a "Submit Bid" text box 124, and then clicking a "Submit Bid" button 126. The bidder may optionally set an expiration date for the bid; the bid is withdrawn if the seller fails to respond before this date. In addition, an administrator of the web site may set a minimum bid percentage, i.e., the minimum allowable percentage of the list price 118 that a bidder can bid for an item.

Figure 2:
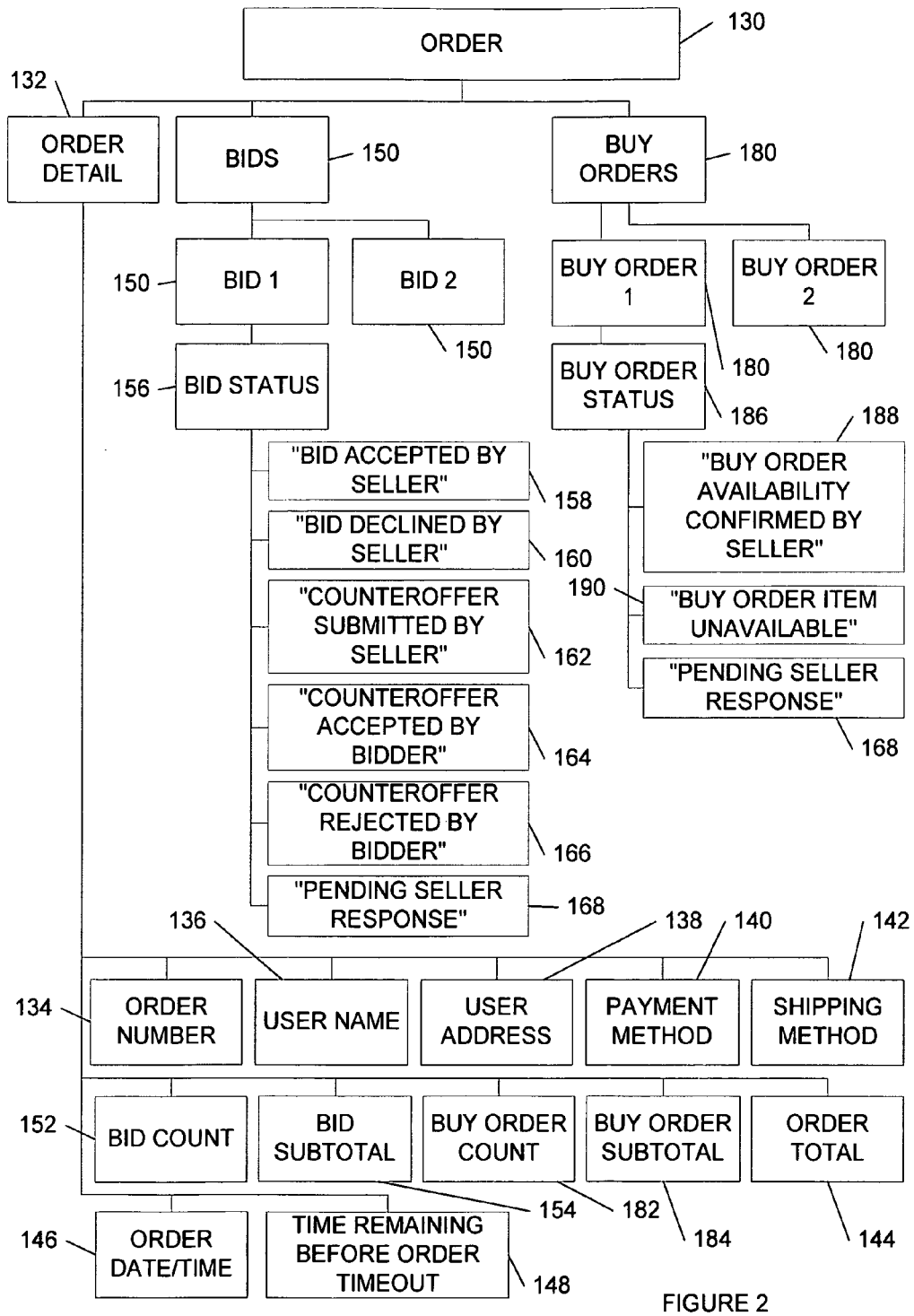
FIG. 2 is an organizational chart of an order for items in the "For Sale" section.

With reference now to FIG. 2 of the Drawings, there is illustrated an organizational chart of an order 130. As shown in the figure, order 130 includes a user's bids 150 and buy orders 180. Each order is assigned an order number 134. An order 130 includes order detail 132 regarding bid count 152, i.e., the number of bids placed, bid subtotal 154, buy order count 182, i.e., the number of buy orders placed, buy order subtotal 184, and order total 144. Additional data for order detail 132 include user name 136, user address 138, payment method 140 and shipping method 142.

An order 130 may have numerous bids 150 and buy orders 180 for items 102 owned by one or more sellers, e.g., BID 1 and BID 2, and BUYORDER 1 and BUYORDER 2, respectively. When a user submits an order 130 for processing, it becomes an "order pending." An "order pending" is an order within which negotiation between buyer and seller has not yet ended for one or more items within the order 130.

Each bid 150 in order 130 has a bid item negotiation status 156, and each buy order 180 in order 130 has a buy order item status 186. The bid item negotiation status 156 is real-time and depends on buyer and seller negotiation. Buy order item status 186 is also real-time and depends on item availability. Buy order item status 186 may include: "buy order item availability confirmed by seller" 188 and "buy order item unavailable" 190. Bid item negotiation status 156 may include: "bid accepted by seller" 158, "bid declined by seller" 160, "counteroffer submitted by seller" 162, "counteroffer accepted by bidder" 164, and "counteroffer rejected by bidder" 166. When the seller has not yet responded to a bid 150 or buy order 180, the status indicates that it is "pending seller response" 168.

Also included in the order detail are an order submission date and time 146 and the time remaining before order timeout 148. The order timeout is the deadline for negotiations. The order timeout period is the period of time, in days, between the order date and the date that buyer and seller negotiations for each item 102 within which the order 130 must end. An administrator of the web site may set the order timeout period. Alternatively, the system may allow the seller or prospective buyer to set the order timeout period. After the order timeout period is reached for an order 130, a final order confirmation is generated by the system to notify the buyer who placed the order.

After order timeout, all bids 150 with a status of "pending seller response" 168 are automatically rejected by the program, and all buy orders 180 with a status of "pending seller response" 168 are cancelled. If the status of a bid 150 is "counteroffer submitted by seller" 162 and the counteroffer has not yet been accepted by the bidder after the aforementioned order timeout, that counteroffer is also cancelled automatically.

A match occurs when buyer and seller agree to a sale price for an item. A match item is an item 102 for which buyer and seller have agreed to a sale price. The match price is the sale price for which the buyer and seller have agreed to exchange the item. After a match occurs, the system generates an item shipment request notification and sends it to the seller. The item shipment request notification confirms to the seller that there is a sale pending for the item and requests that the item be sent to the third party for item verification. After a match occurs, "Sale Pending" text appears next to the item 102 listed in the "For Sale" section 100, as shown in FIG. 1.

After a match occurs, a "Waitlist" button also appears next to the item 102 listed in the "For Sale" section 100. Another interested buyer can click on the waitlist button for the "Sale Pending" item. If the first buyer does not complete the sale, then the item will be offered exclusively, on a first-come-first-served basis, to buyers on the waitlist for the item. In addition, if a seller has yet to agree to a bid from a bidder, any subsequent bidders who place the same bids (at the match price) are automatically added to the waitlist for that item.

A pending order becomes an "order confirmed" either after all bids, buy orders, and counteroffers within the order have been accepted or declined or after order timeout 148 is reached. After an order becomes confirmed, the system sends a final order notification to the buyer.

Seller Controls

Figure 3:
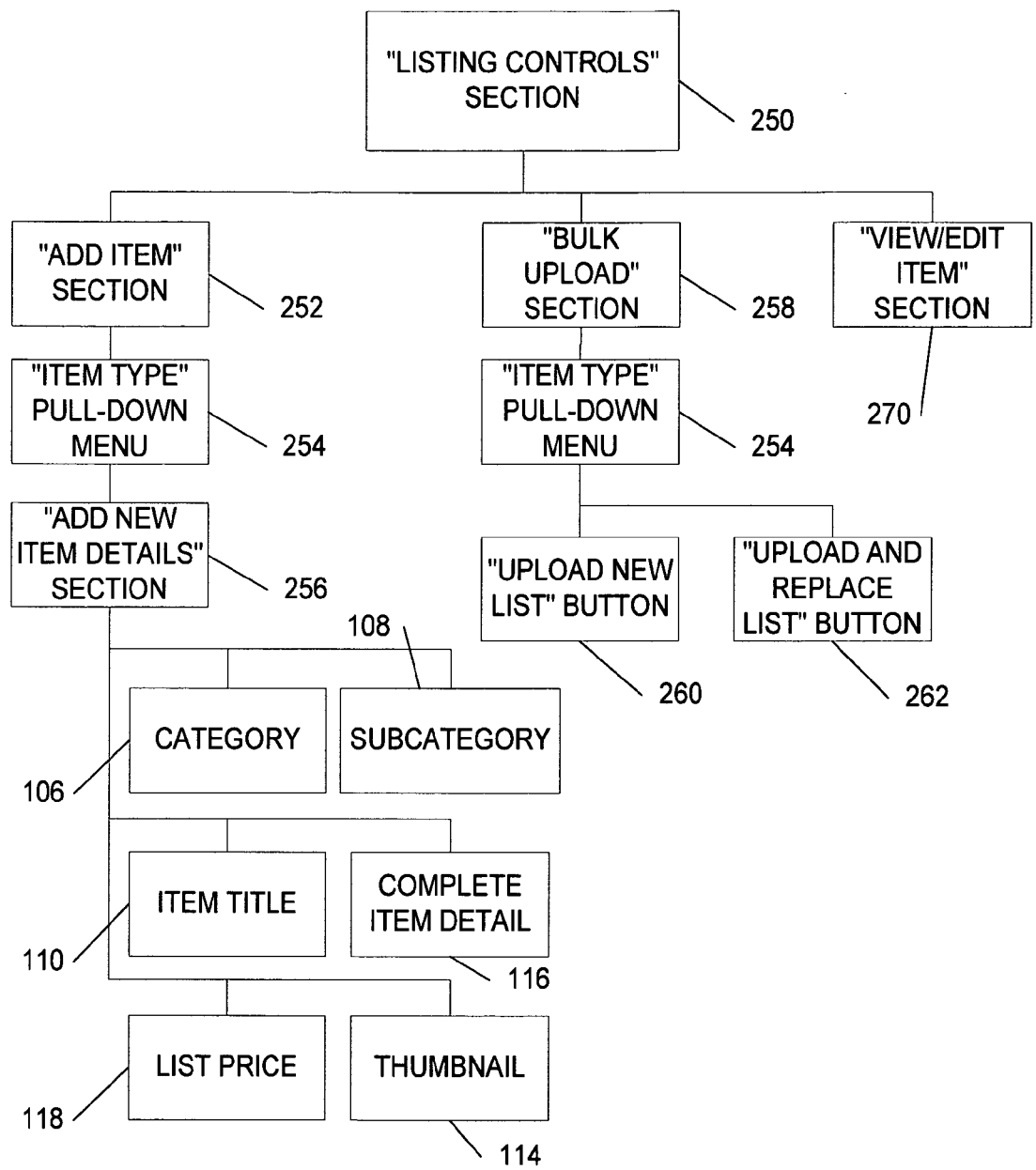
FIG. 3 is an organizational chart of a seller's "Listing Controls" section within which a seller remotely accesses and autonomously manages data regarding sale items.

With reference to FIG. 3 of the Drawings, there is illustrated an organizational chart of a seller's "Listing Controls" section 250 showing an embodiment of the seller's ability to remotely access and autonomously manage data regarding sale items 102 in the aforementioned "For Sale" section 100. As shown in FIG. 3, the seller's "Listing Controls" section 250 may further include an "Add Item" section 252, a "Bulk Upload" section 258, and a "View/Edit Item" section 270.

In the "Add Item" section 252, the seller selects the item type under which the sale item will be listed by using an "Item Type" pull-down menu 254. When an item type is selected, an "Add New Item Detail" section 256 is displayed, wherein a seller enters detailed data regarding the aforementioned category 106, subcategories 108, item title 110, complete item detail 116, the list or ask price 118, and pictorial thumbnail scans 114 of the item. After submission, the item is posted on the web site under the proper category 106 and subcategories 108, described hereinabove.

Alternatively, a "Bulk Upload" section 258 allows a seller to upload multiple items to a particular subcategory 108 at one time. The seller selects the item type under which the sale item will be listed by using the "Item Type" pull-down menu 254. The user selects a file on the computer that contains new items to list and clicks on an "Upload New List" button 260 to upload the items to the web site. It should be understood that the uploaded file format must be consistent with that recognized by the program and the specific item type 104. If so, the new items in the uploaded list are integrated into a master list for that item type 104 within the subcategories 108 specified by the user. Otherwise, the items are rejected by the program and are not listed in the "For Sale" section 100. A notification is sent to the seller providing information on the acceptance or rejection of each item in a bulk load.

Additionally, a seller may replace a previously uploaded item list with an updated list. The seller selects a file on the computer that contains items to list and clicks on an "Upload and Replace List" button 262 to replace the old list on the web site. The new list may contain unchanged items from the previous list, modified items from the previous list, as well as completely new items. The program can recognize which items are new or changed and distinguish them from items on the previously uploaded list.

Figure 4:
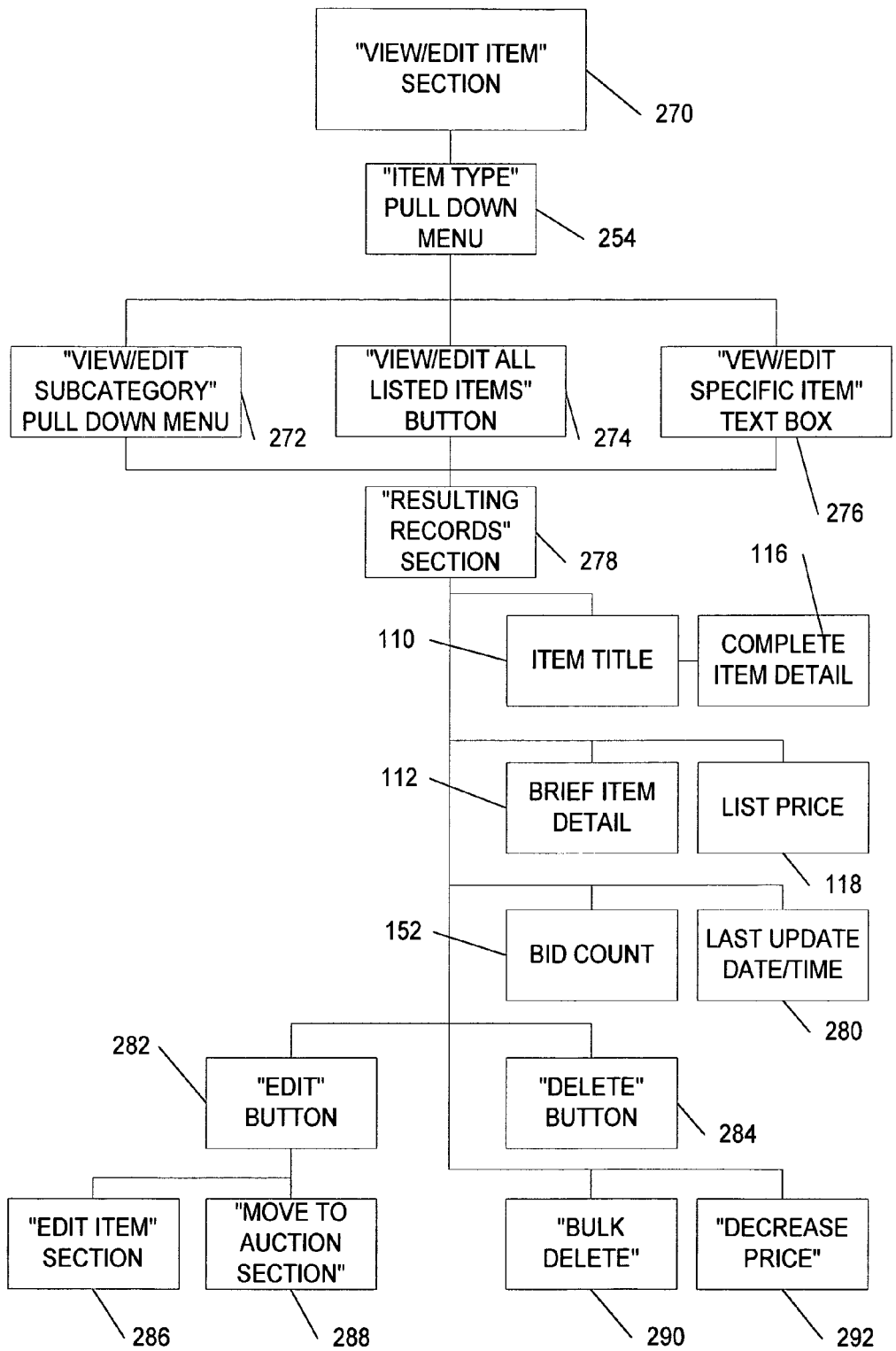
FIG. 4 is an organizational chart of a "View/Edit Item" section of the seller's "Listing Controls" section within which the user accesses and edit items that are listed in the "For Sale" section.

With reference now to FIG. 4 of the Drawings, there is illustrated the "View/Edit Item" section of the seller's "Listing Controls" section 250, wherein the seller accesses and edits items that are listed in the "For Sale" section 100. The seller selects items to view for a particular item type 104 by using the aforedescribed "Item Type" pull down menu 254. The seller then has the options of selecting an entire subcategory 108 by using a "View/Edit Subcategory" pull-down menu 272, viewing all items the seller has listed on the web site by clicking the "View/Edit All Listed Items" button 274, or searching a specific item by typing a description in a "View/Edit Specific Item" text box 276. Resulting records 278 are displayed with detailed data regarding item title 110 with a hyperlink to the complete item detail 116, brief item description 112, the list price 118, the last update date/time 280, and the bid count 152. "Decrease Price" functionality 292 may allow a seller to decrease the list price of multiple items by a percentage specified by the seller. "Bulk Delete" 290 functionality may allow a seller to delete multiple items. Also displayed are an "Edit" button 282 and a "Delete" button 284. A seller selects the "Delete" button 284 to delete a specific record. If a user selects the edit button 282, an "Edit Item" section 286 for the specific item will be displayed. The "Edit Item" section 286 contains information that was provided on the "Add New Item Detail" section 256. The seller can edit and change description fields for the listings. The seller is also able to move an item the seller has listed in the "For Sale" section 100 to the auction section 700 (discussed hereinbelow) by clicking a "Move to Auction" button 160. The seller must then provide the data required for the auction (discussed further below).

Buy Orders

Figure 5:
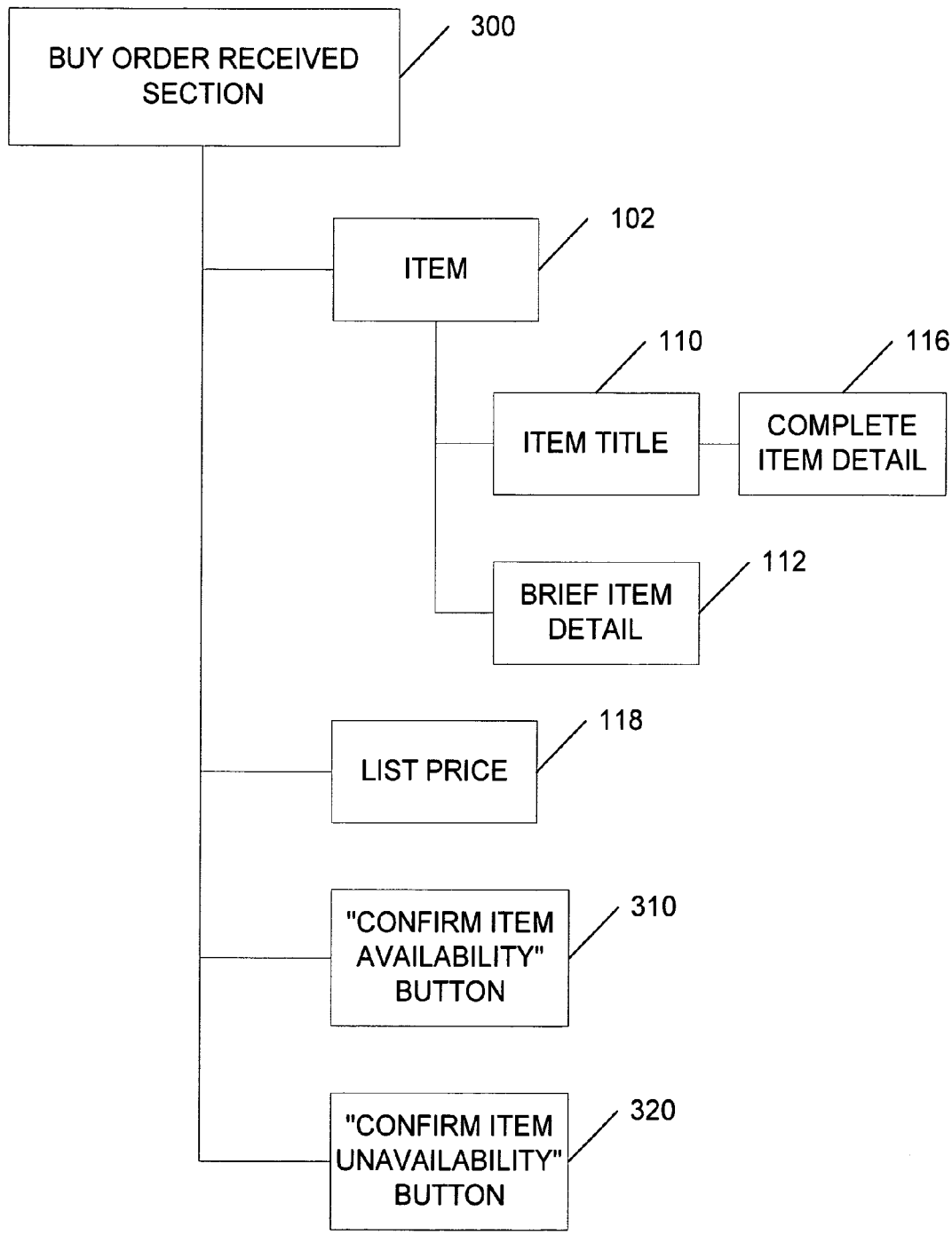
FIG. 5 is an organizational chart of a seller's "Buy Orders Received" section within which a seller responds to buy orders received for items listed in the "For Sale" section.

With further reference to FIG. 5 of the Drawings, there is illustrated an organizational chart of a "Buy Orders Received" section 300, wherein sellers administer buy orders for goods and services they want to sell. It shows the seller buy orders 180, described hereinabove in connection with FIG. 2, that have been placed on items 102 listed in the "For Sale" section 100. As shown in FIG. 5, detailed data regarding the item title 110, brief item detail 112, and the list price 118 are also displayed. As discussed, for a complete item description, a hyperlink connects item title 110 to the full item detail page 116. The "Buy Orders Received" section 300 also provides a "Confirm Item Availability" button 310 and a "Confirm Item Unavailability" button 320. Once a buy order is received for an item, the seller clicks the "Confirm Item Availability" button 310 to indicate that the item is available to the buyer. Unlike consignment systems, the present invention allows the seller to retain the item before an agreement is reached with a buyer and may provide the seller the autonomy and flexibility to sell the seller's goods through other marketing venues. If the seller has sold the item through another outside process, the seller clicks the "Confirm Item Unavailability" button 320.

Bids and Sales Negotiation

Figure 6:
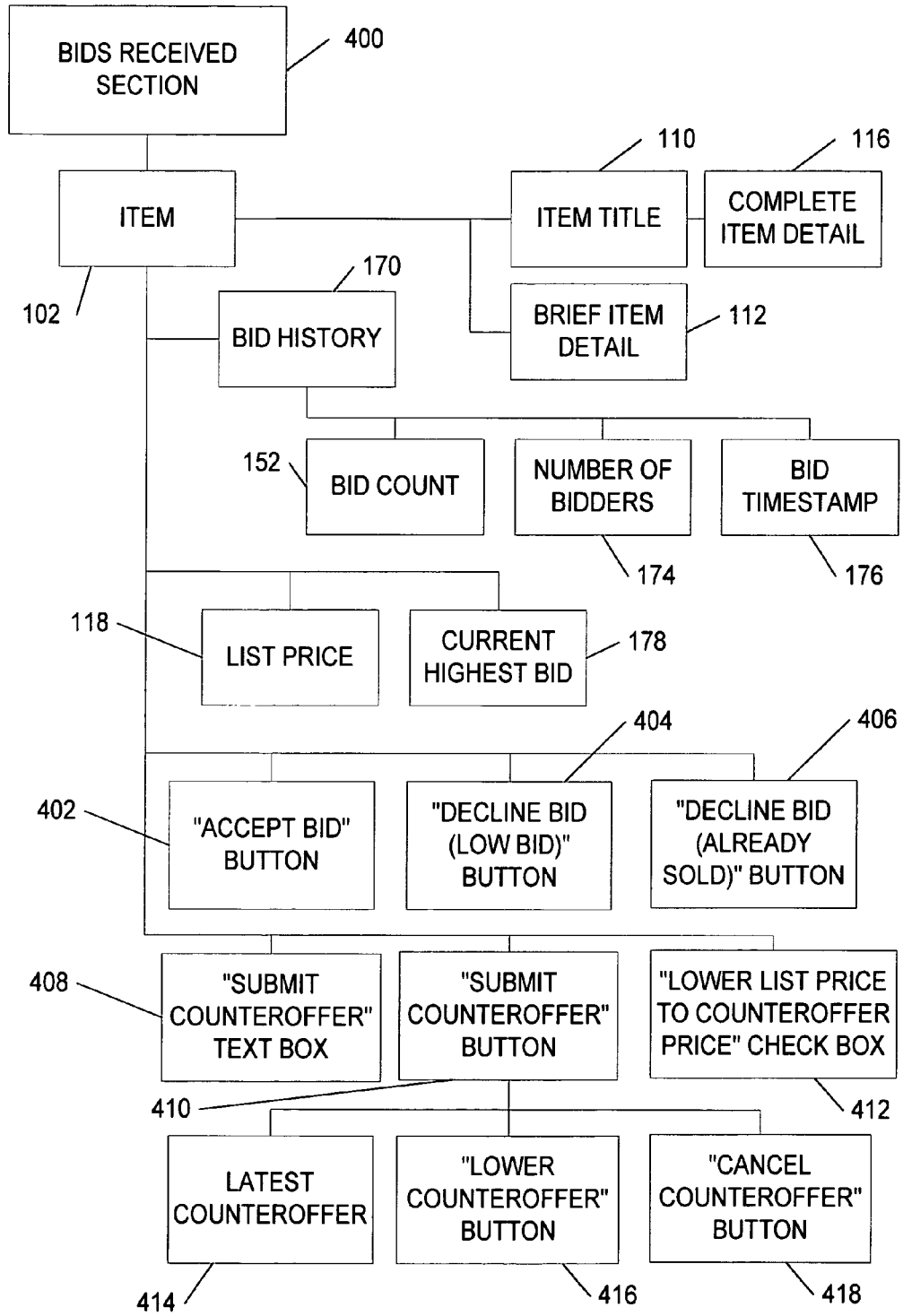
FIG. 6 is an organizational chart of a seller's "Bids Received" section within which a seller responds to bids received for items listed in the "For Sale" section.
Figure 7:
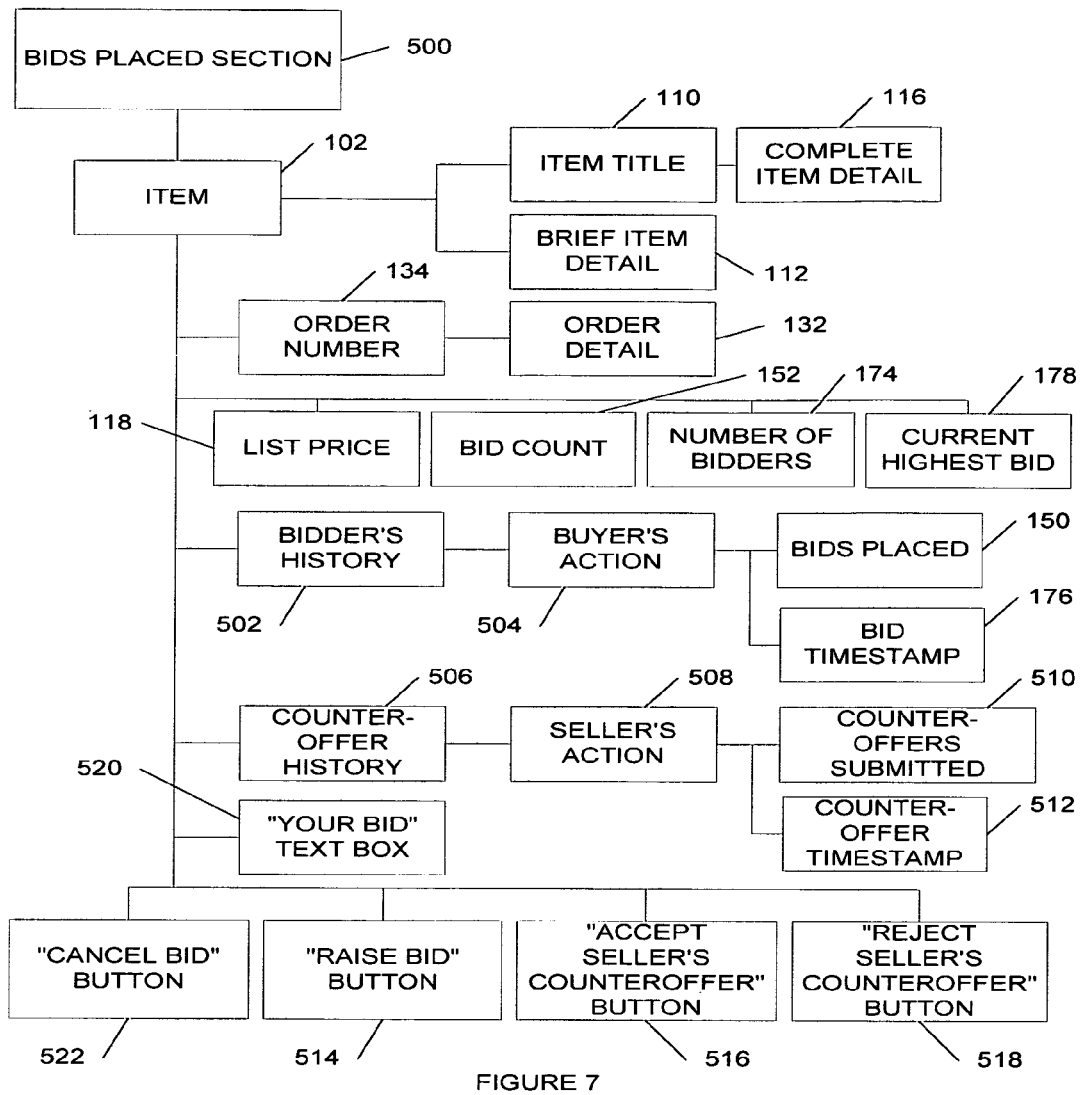
FIG. 7 is an organizational chart of a buyer's "Bids Placed" section within which bidders can raise or cancel bids and respond to seller counteroffers for items in the "For Sale" section.
Figure 8:
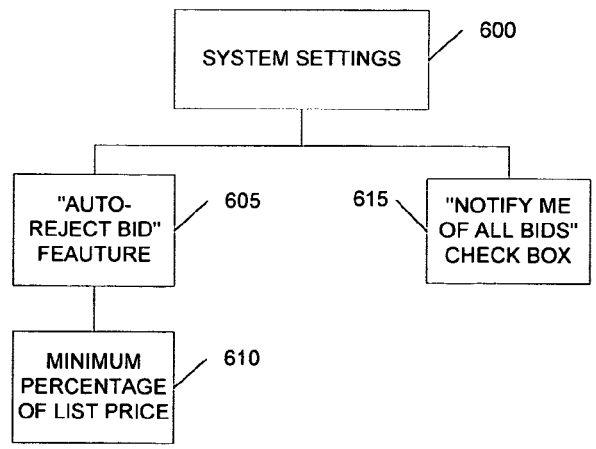
FIG. 8 is an organizational chart of a user's "System Settings" section containing a seller's system settings and seller preferences, such as the use of an "Auto-reject Bid" feature.

With reference now to FIGS. 6, 7, and 8 of the Drawings, there are illustrated organizational charts showing an embodiment of the negotiating functionality of the present invention, wherein a series of one or more offers and counteroffers are exchanged. In response to a bid, the seller can accept the bid, decline the bid, or submit a counteroffer. A counteroffer may be an offer by the seller to the bidder to sell the item for a price greater than the bid but less than the seller's list price.

As shown in FIG. 6, a "Bids Received" section 400 allows sellers to administer and negotiate bids for goods and services they want to sell. The following real-time information on the item 102 is displayed: the item title 110 with a hyperlink to the complete item detail 116, the brief item detail 112, the seller's list price 118, and the current highest bid 178. Additional data includes a bid history 170 regarding the bid count 152, i.e., the number of bids on the item, the number of bidders 174 currently bidding on the item, and the bid date/time stamp 176.

To instruct the system to accept the current highest bid 178, the seller clicks an "Accept Bid" button 402. The system notifies the bidder on item 102 that the seller of the item 102 has accepted the bid 150. To instruct the system to decline the current highest bid 178 because the seller decides that the bid is too low, the seller clicks a "Decline Bid (low bid)" button 404. To instruct the system to decline the current highest bid 178 because the seller has sold the item privately off the web site, the seller may click a "Decline Bid (already sold)" button 406. The system then notifies the bidder on an item 102 that the seller of the item 102 has declined the bid 150.

A seller may also submit a counteroffer price. The seller does so by entering the counteroffer price in a "Submit Counteroffer" text box 408 and clicking a "Submit Counteroffer" button 410 to submit the counteroffer to the bidders. The system notifies the bidder on item 102 that the seller has submitted a counteroffer for the item 102. The seller may optionally set an expiration date for the counteroffer; the counteroffer is withdrawn if the bidder fails to respond before this date.

With further reference to FIG. 6, there is a "Lower List Price to Counteroffer Price" check box 412 that, when checked before submitting the counteroffer, reduces the seller's list price 118 on the site to the counteroffer price submitted. If check box 412 is not marked, only the users bidding will be aware that the counteroffer price is acceptable to the seller and the list price 118 will not be lowered. If new bidders place bids lower than the counteroffer, they receive notification of the counteroffer as well. If a new bidder places a bid at or above an active counteroffer or placed a buy order at the seller's ask price, the bid is automatically accepted. After submission, the counteroffer is displayed as the "Latest Counteroffer" 414. After a counteroffer is submitted the "Submit Counteroffer" button 410 becomes a "Lower Counteroffer" button 416 in case the seller decides to lower the counteroffer. There is also a "Cancel Counteroffer" button 418, which withdraws the counteroffer if the bidder has not yet accepted the counteroffer. A notification is sent to the bidder of item 102 when a counteroffer has been cancelled by the seller.

With reference now to FIG. 7, a "Bids Placed" section 500 allows bidders to administer and negotiate bids for goods and services they want to buy. A bidder sees the items 102 that the bidder is actively bidding on, i.e., bids 150 that the bidder has placed but have not been accepted or declined by the seller. All data are in real-time. For each item 102, the item title 110 and brief item detail 112 are shown with a link to the complete item detail page 116. A hyperlink to a bidder's history 502 provides additional data regarding the bidder's actions 504 related to item 102, including all bids 150 placed by the bidder, as well as time and date stamp information 176 of the bids. A link, i.e., a hyperlink, to a counteroffer history 506 provides additional data regarding the seller's actions 508 related to the item 102, including all counteroffers submitted 510 by the seller, as well as well as time and date stamp information 512. The "Bids Placed" section 500 may also display the order number 134, the seller's list price 118, the current highest bid 178, the bid count 152, and the number of bidders 174 on the item.

As additionally shown in FIG. 7, a text box 520 displays the current bid, i.e., "Your Bid." To increase a bid 150, the buyer types in a bid greater than the current bid and less than or equal to the seller's list price 118, and clicks the "Raise Bid" button 514. After the bidder presses the "Raise Bid" button 514, the seller receives notification that the bid has been raised. The seller can then respond to the bid by accepting it, declining it or submitting a counteroffer. There are also an "Accept Seller's Counteroffer" button 516 and a "Reject Seller's Counteroffer" button 518. A notification is sent to the seller of item 102, after the buyer that is bidding on the item 102 accepts the seller's counteroffer, by clicking on the aforementioned "Accept Seller's Counteroffer" button 516. A notification is sent to the seller of item 102, after the buyer bidding on the item 102 declines the seller's counteroffer, by clicking on the aforementioned "Reject Seller's Counteroffer" button 518. Alternatively, the bidder may cancel the bid 150 by clicking on the "Cancel Bid" button 522, after which a notification of the cancellation is sent to the seller of item 102.

With reference now to FIG. 8 of the drawings, there is illustrated an "Auto-Reject Bid" feature 605 that enables a seller to specify a minimum percentage 610 of the list price 118, below which the system, designated generally by the reference numeral 600, will automatically decline any bid 150. The system 600 "System Settings" page allows sellers to set the "Auto-reject Bid" feature 605. If the "Auto-reject Bid" feature 605, however, is set and a bid 150 is placed for the seller's item that is less than the specified percentage 610 of the list price 118, the bid will automatically be declined and no notification of the bid is sent to the sender. This feature reduces response time between the time the bid 150 is submitted and the time the bidder is notified that the seller has declined the bid 150. Alternatively, the seller can choose to be notified of all of the bids 150 by clicking a "Notify me of all bids" check box 615, in which case the seller must respond manually to all bids 150. It should be understood that the seller is also able to set the "Auto-Reject Bid" feature 605 for particular items pursuant to additional embodiments of the instant invention.

Auction Section

Figure 9:
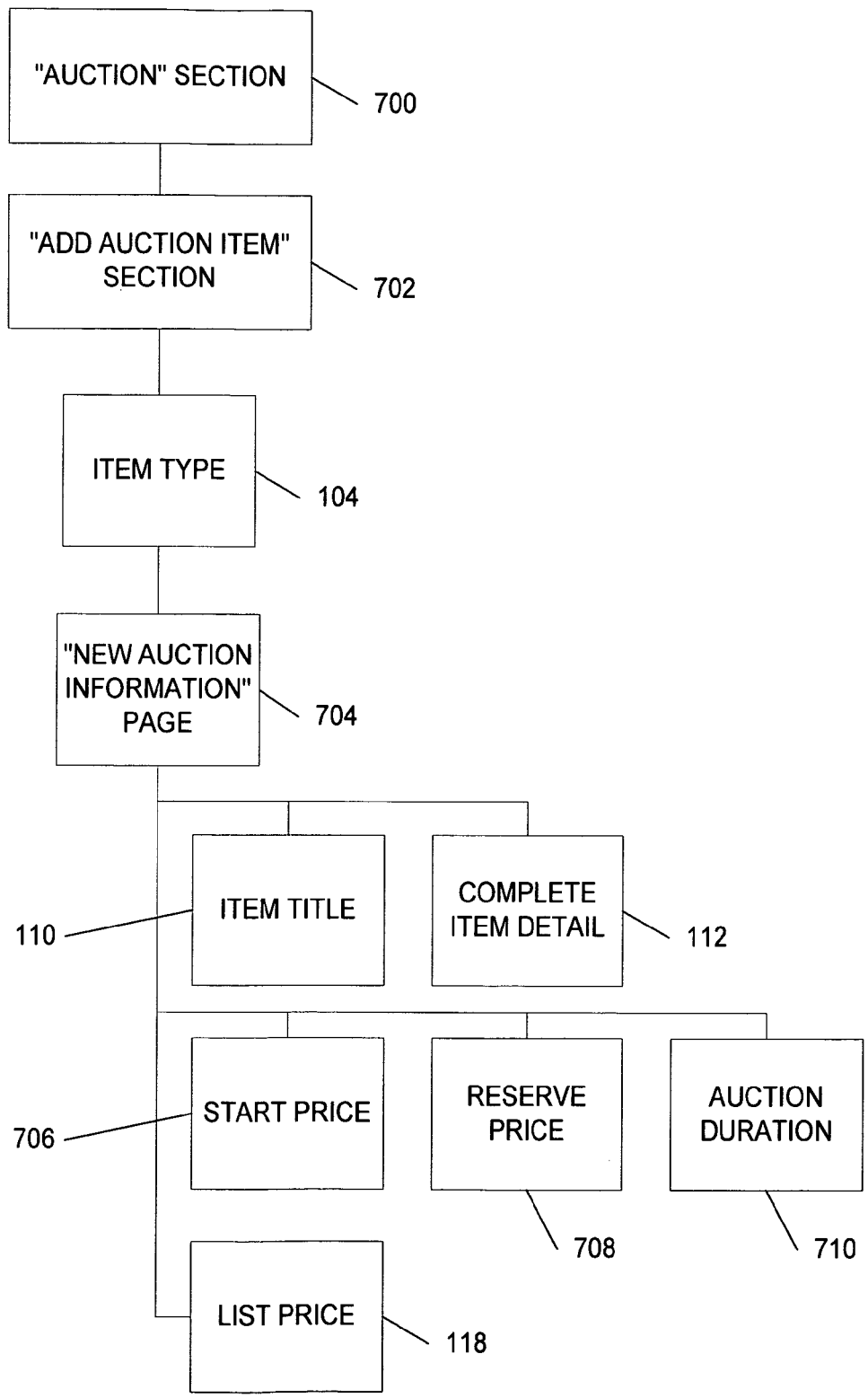
FIG. 9 is an organizational chart of a seller's "Add Auction Item" section.
Figure 10:
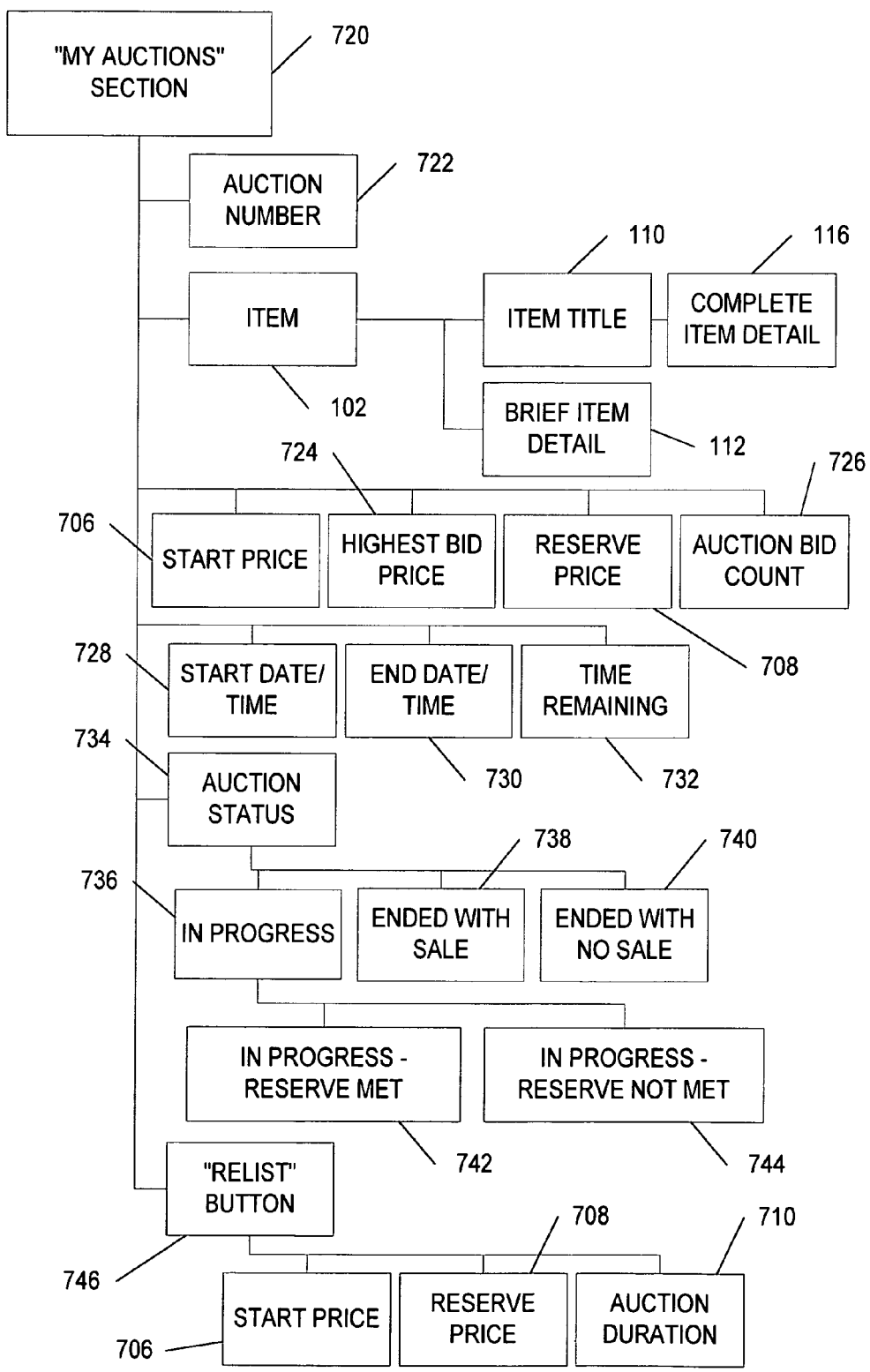
FIG. 10 is an organizational chart of a seller's "My Auctions" section within which the seller can view current and past auctions, edit items, and re-list items.
Figure 11:
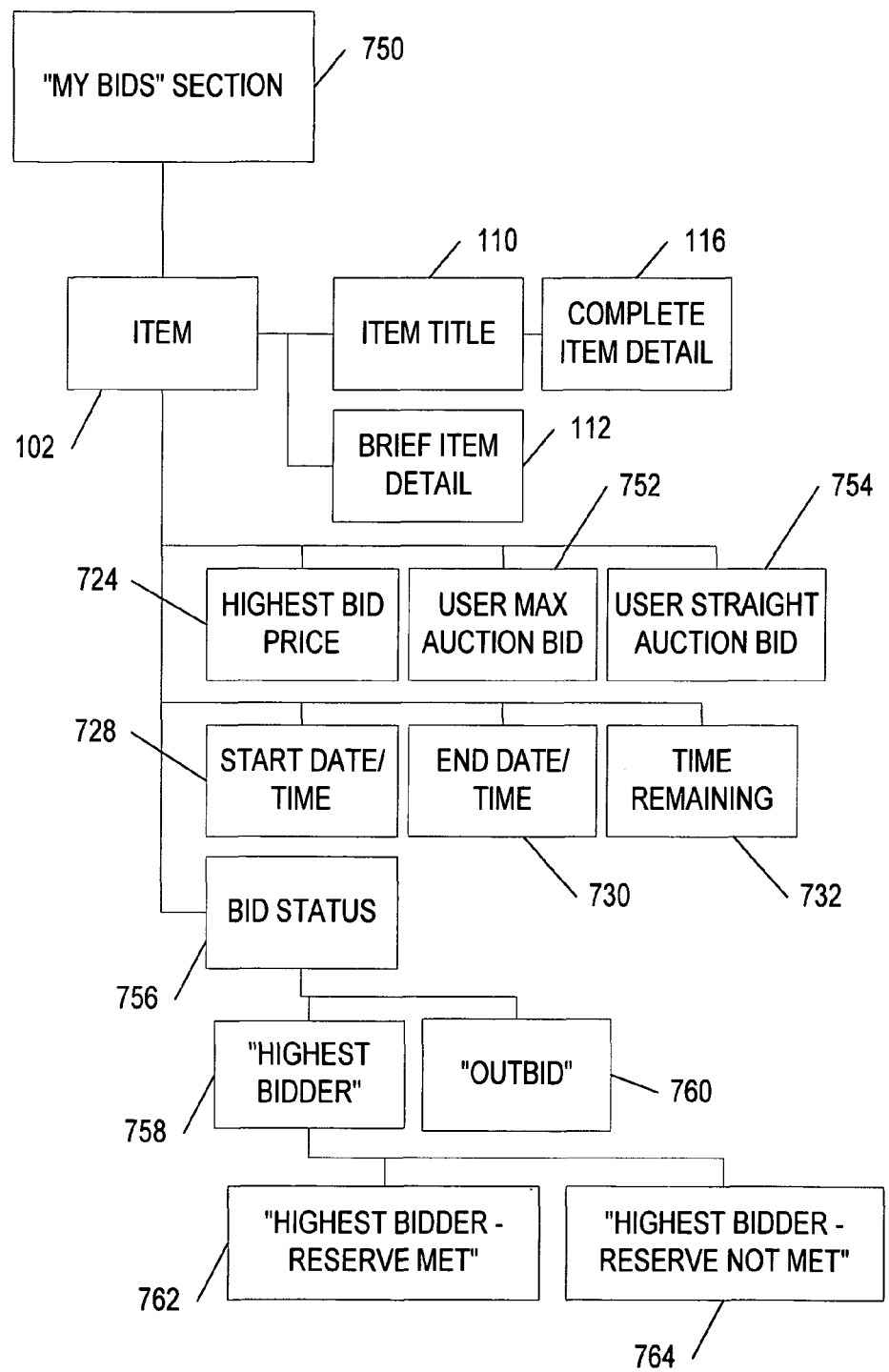
FIG. 11 is an organizational chart of a bidder's "My Bids" section within which the bidder can view bids.

With reference now to FIGS. 9, 10, and 11 of the Drawings, there are illustrated organizational charts, wherein another embodiment of the present invention is integrated with an online auction system.

As shown in FIG. 9, an auction seller uses an "Add Auction Item" section 702 to list item 102 in the "Auction" section 700 of the web site. The seller lists the item remotely and independently of web site administrators. The seller selects an item type 104 and proceeds to the "New Auction Information" page 704, where the seller provides the aforementioned item title 110, complete item detail 116, a start price 706, an optional reserve price 708, the auction duration 710, and the "For Sale" section list price 118. If the item does not sell at auction (the auction price is not greater than or equal to the seller's start price or reserve price), the program automatically lists the unsold item in the aforementioned "For Sale" section 100 of the web site at the price 118 specified by the seller.

As illustrated in FIG. 10, a "My Auctions" section 720 shows a seller the items 102 that the seller is currently auctioning, as well as items the seller has auctioned in the past. The following information is displayed on the My Auctions Page: item title 110 with a hyperlink to the complete item detail 116, the brief item description 112, the start price 706, a highest bid price 724, the reserve price 708, an auction bid count 726, a start date and time 728, an end date and time 730, a time left until end of auction 732, and an auction status 734. The auction status 734 indicates whether the auction is in progress 736, has ended with a sale 738, or has ended without a sale 740.

After an auction ends successfully, the seller receives a notification to send the item to an administrator for post-sale execution and verification. If the auction is in progress 736, it will also have a "reserve met" status 742 or a "reserve not met" status 744, as shown in FIG. 10.

If the item did not sell at auction, it is listed in the "For Sale" section 100 at the list price 118 specified by the seller. A seller may use a "Relist" button 746 next to items that failed to auction to facilitate moving the item from the "For Sale" section 100 back to the "Auction" section 700. When a user clicks the "Relist" button 746, a resulting page enables the user to enter and submit a new start price 706, reserve price 708, and auction duration 710.

As illustrated in FIG. 11, a "My Bids" page 750 shows the auction bidder the following information: the auction items 102, the item title 110, the brief item detail 112, a hyperlink to the complete item detail 116, the highest auction bid 724, a bidder's maximum auction bid 752, a bidder's straight bid 754, the auction start date and time 728, the auction end date and time 730, the time left until auction end 732 and a bidder's auction bid item negotiation status 756.

For an auction in progress, the bidder can submit a maximum bid 752 and/or a straight bid 754. The auction bid item negotiation status 756 will indicate whether the bidder has the highest auction bid 758 or has been outbid 760. If the bidder is the high bidder, the auction bid item negotiation status 756 will also indicate whether the reserve has been met 762 or not been met 764. If the auction has ended and the reserve has been met, the item 102 is sent to the highest bidder's shopping cart page, which the bidder checks out.

Post-Sale Verification

Figure 12:
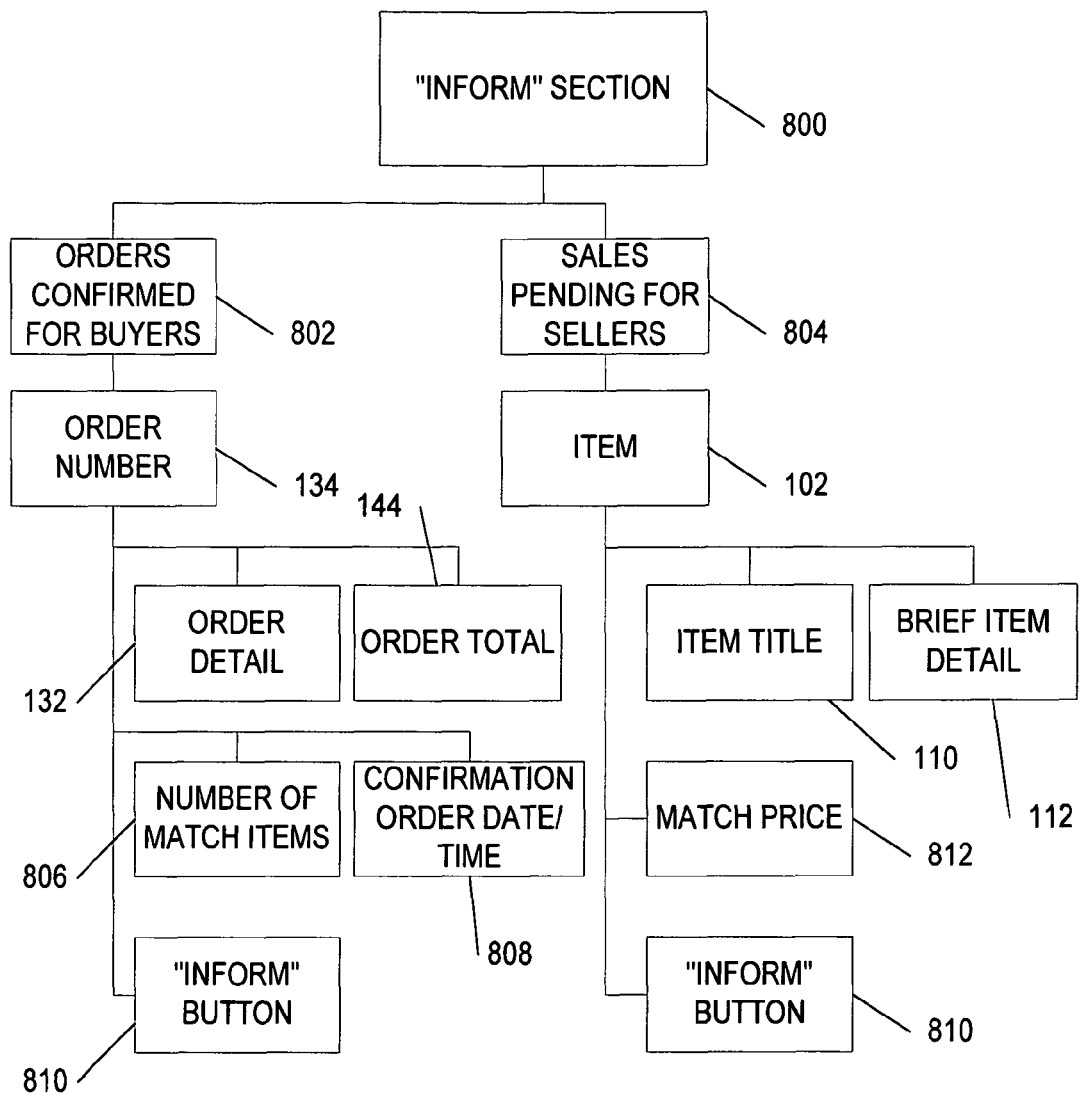
FIG. 12 is an organizational chart of the "Inform" section which notifies the administrator that items for verification and payment have been sent.

With reference now to FIG. 12 of the Drawings, there is illustrated an organizational chart of an "Inform" section 800, wherein an embodiment of the post-sale transaction process of the present invention is illustrated. The post-sale trade execution status of item 102 includes: "item sale completed (finished)," "item verified by administrator," or "item rejected by administrator."

The "Inform" section 800 presents the following data on sales for item 102 pending for sellers 804: the item title 110, the brief item detail 112, and a match price 812. An "Inform" button 810 is also displayed next to all sale pending items. When a seller clicks on the inform button 810 next to a sold item 102, a notification is generated to inform the third party verifier that the seller has sent the item to the third party in order for the item to be verified. Verification may be conducted by people inside or outside the company running the web site.

The "Inform" section 800 presents the following data on orders confirmed for buyers 802: the order number 134, the order total 144, the number of match items within the order 806, the order confirmed date and time 808, and the detailed order information 132. The "Inform" button 810 is also displayed for the order number 134. After an item has been verified, buyers use the "Inform" button 810 to notify an administrator of the web site that payment has been sent for the order specified.

Figure 13:
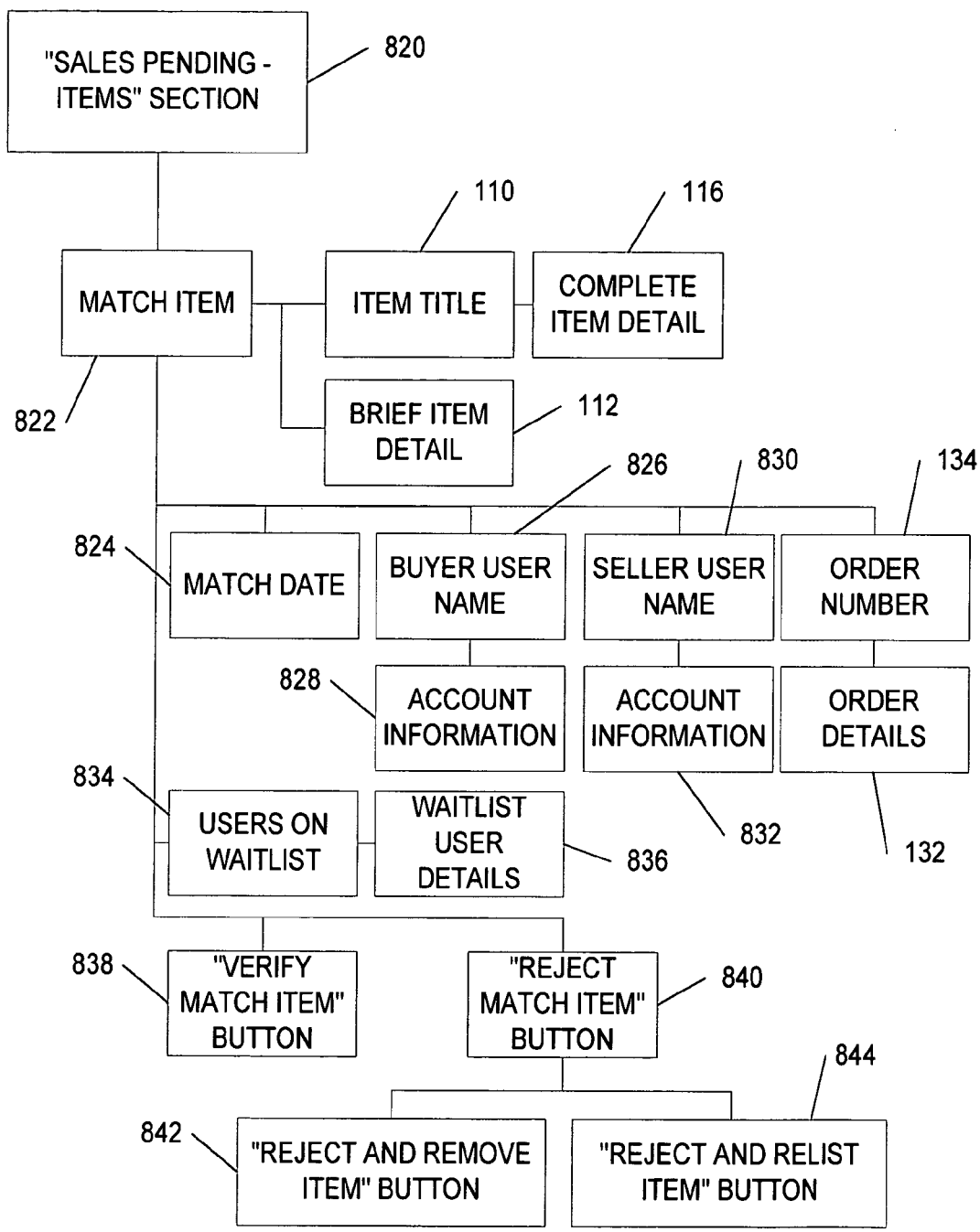
FIG. 13 is an organizational chart of the administrator's "Sales Pending—Items" section, within which administrator can view buyer, seller and item information and verify or reject sales pending items.

With reference to FIG. 13 of the Drawings, a "Sales Pending—Items" section 820 is illustrated, wherein an administrator of the web site can view items that have reached the "sales pending" status, i.e., items for which buyer and seller have ceased negotiation and agreed on price. The "Sales Pending—Items" section 820 allows the administrator to manage the verification process. The following information is displayed about a match item 822: the item title 110 and the brief item detail 112 with a hyperlink to the complete item detail 116, a match date 824, the order number 134, user names of buyers on the waitlist for the item 834, as well as waitlist user details 836, seller user name 830, and buyer user name 826. Links, e.g., hyperlinks, connect the order number 134 to the complete order detail 132, seller user name 826 to seller user account information 828, and buyer user name 830 to buyer user account information 832, respectively. Also displayed are a "Verify Match Item" button 838 and a "Reject Match Item" button 840 next to each match item 822.

After the third party receives the match item 822 and verifies that the actual item detail is equal to the complete item detail 116 specified by the seller for the match item 822 on the web site, an administrator clicks on the "Verify Match Item" button 838 next to the item. Once clicked, the text "Verified" appears next to the item indicating that the item has passed the screening process, has been verified, and can be shipped to the buyer.

If the actual item detail for the match item 822 received, upon inspection, is not equal to the complete item detail 116 specified by the seller for the match item 822 on the web site, the administrator clicks a "Reject Match Item" button 840 and a "Reject and Remove Item" button 842, which will remove the item from the buyer's order 130 and will permanently delete the item from the web site. The buyer and seller are notified that the match item 822 was removed from the order 130 because it was not verified. In this case, the match item 822 will be shipped back to the seller. The administrator also has the option of trying to broker a deal between buyer and seller for the match item 822 at a new match price 812 given the actual item detail.

If the buyer defaults on payment or does not pay within an agreed time frame, the administrator clicks the "Reject Match Item" button 840 and the "Reject and Re-list item" button 844, which will remove the item from the order 130 and make it available for other buyers by re-listing it in the "For sale" section 100. The buyer and seller are notified that the match item 822 was removed from the order 130 because the buyer has not paid and the match item 822 will be shipped back to the seller. In addition, the item 102 will then be offered to the first buyer on the waitlist for the item 102.

Figure 14:
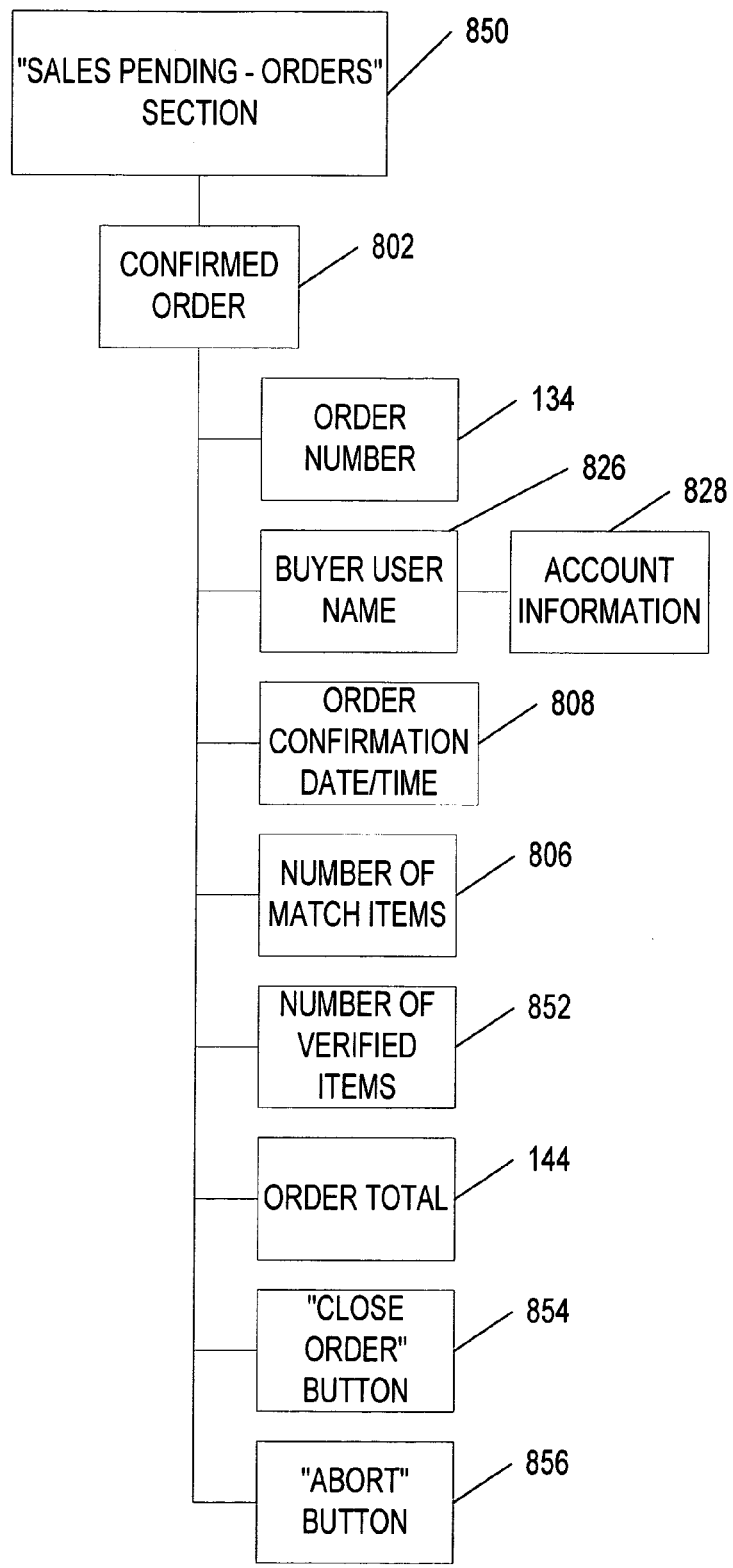
FIG. 14 is an organizational chart of the administrator's "Sales Pending—Orders" section, within which administrator can view buyer, seller and order information and close or abort orders.

With reference now to FIG. 14 of the Drawings, there is illustrated a "Sales Pending—Orders" section 850, wherein an administrator of the web site can view and administer confirmed orders 802 with one or more match items 822 within the order. The following information is displayed: order confirmation date and time 808, i.e., the date and time when negotiation between buyer and seller has ceased for all items 102 within the order 130, the order number 134, the order total 144, the aforedescribed buyer user name 826 with a hyperlink to respective account information 828, the number of match items 806, and the number of items verified by the administrator 852. The administrator uses a "Close Order" button 854 to close the order 130. Once the close button 854 is clicked, the verified items within the order 130 are no longer listed on the web site. Alternatively, the administrator may abort the order if there is a problem with the buyer by clicking an "Abort Order" button 856.

Waitlist Functionality

Figure 15:
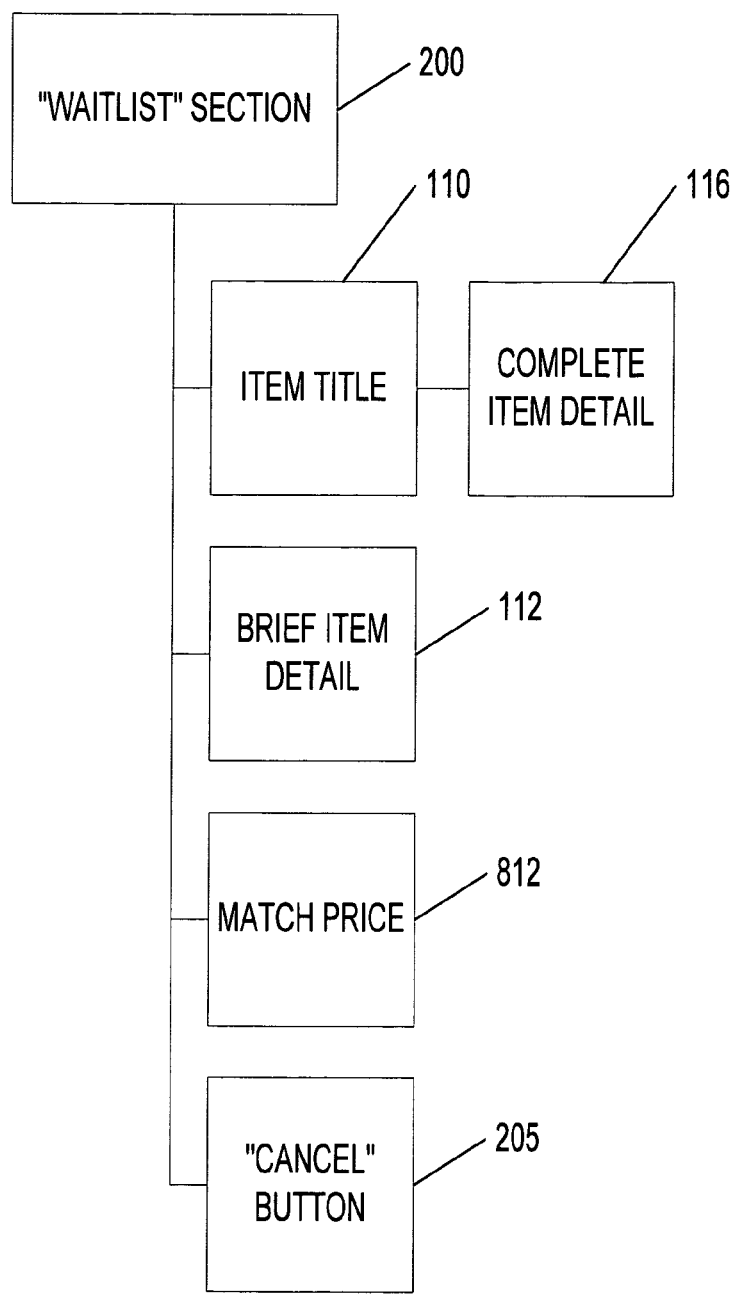
FIG. 15 is an organizational chart of a buyer's "Waitlist" section within which the user can view and cancel waitlist items.

The web site embodying the present invention may provide a waitlist functionality. Referring now to FIG. 15 of the Drawings, there is illustrated an organizational chart for a buyer "Waitlist" section 200, wherein the buyer can view items for which the buyer is on a waitlist. Section 200 displays data regarding the item title 110 and the brief item detail 112, a hyperlink connecting the item title 110 to the complete detailed item information 116, and the match price 812. When a user has viewed an item already in the process of being sold to another buyer, the user may click a "Waitlist" button to indicate interest in purchasing the item. In addition, if a seller has yet to agree to a bid from a bidder, any subsequent bidders who place the same bids (at the match price) are automatically added to the waitlist for that item.

If the current buyer defaults on payment or does not pay within the required time period set by the system, an administrator of the site can use the system to offer the item to the first user on the waitlist. The system notifies the first user on the waitlist that the item on the waitlist is available and has been reserved for the user for the waitlist timeout period. The waitlist timeout period is the time that a waitlist buyer has to order an item that has been reserved for that waitlist buyer. An administrator of the web site may set the waitlist timeout, which is the deadline, in days, between the date an item in the for sale section is made available exclusively to the waitlist buyer and the date when the item is no longer held for the waitlist buyer. After the waitlist timeout period has expired, the item is taken off reserve for the waitlist buyer, and if there is another waitlist buyer in the queue, it is made available to that waitlist buyer. The first user on the waitlist for the item has a limited amount of time within which the first user is offered the item exclusively. If the first waitlist user does not order the item within the required time period, an administrator of the site can use the system to offer the item to the next user on the waitlist. This process continues until the item is sold or there are no other users left on the waitlist. If the buyer on the waitlist no longer wants to purchase the item, the buyer can cancel the request to purchase the item with a "Cancel" button 205. If the order is closed before an item is offered to a buyer on the waitlist, the item may be placed on the user's wantlist so the user will be notified if an identical item is listed in the future. The system notifies the waitlisted buyer that was on the waitlist that the sale of the item is complete and that the user is no longer on the waitlist for the item. It also notifies the user that the item has been placed on the user's wantlist so the user will be notified if an identical item is listed in the future.

Wantlist Functionality

Figure 16:
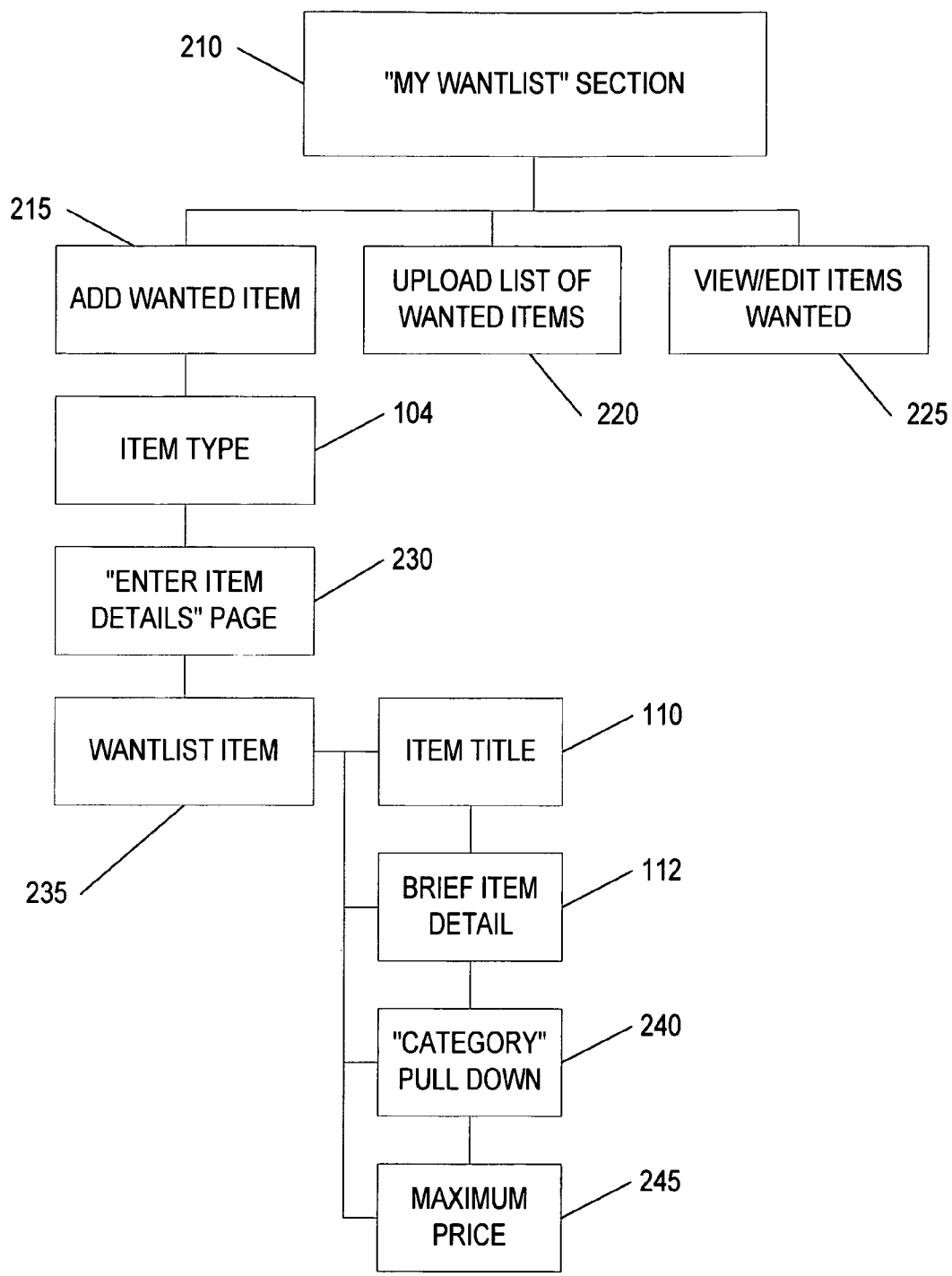
FIG. 16 is an organizational chart of a buyer's "Wantlist" section within which the user can add, upload, edit and delete items to the wantlist.

The web site embodying the present invention may provide a "wantlist" functionality. With reference now to FIG. 16 of the Drawings, there is illustration of an organizational chart of a buyer's "My Wantlist" section 210. The buyer user can add a wantlist item individually through an "Add Wanted Item" section 215. Alternatively, the buyer can upload a list of wantlist items through an "Upload List of Wanted Items" section 220. Using a "View/Edit Items Wanted" section 225, the buyer can also view and edit items, as discussed hereinabove. To add wantlist items individually, the user selects an item type 104 to call up a wantlist item detail page 230, wherein the user enters a wantlist item specification 235, which includes: the item title 110, the brief item detail 112, an item category pull-down menu 240 selection, and an optional maximum price 245 the buyer would be willing to pay for the wanted item.

If item 102 is listed in the "For Sale" section 100 or "Auction" section 700 that matches a user's wantlist item specification 235, the system notifies that buyer that the item is available. Another function enables the system to automatically create a match when an item 102 is listed in the "For Sale" section 100 that matches a user's wantlist item specification 235, and if the list price 118 is less than or equal to the wantlist user's maximum price 245 for the wantlist item.

Furthermore, additional functionality may allow a seller to view wantlists and click a "Sell" button next to a wantlist item if that seller has the wantlist item. If the seller's item is indeed an exact match with the wantlist item, a match item is created and a sale pending is assigned to the wantlist user.

While the present invention has been described in connection with a number of exemplary embodiments and implementations, the present invention is not so limited but rather covers various modifications and equivalent arrangements, which fall within the purview of the appended claims.

What is claimed is:

1. A computer-implemented method for facilitating the negotiation and sale of an item between a seller and at least one bidder across a network, said seller and said at least one bidder being remote from one another, said method comprising:

receiving, from said seller to said at least one bidder, item data about said item, said item data comprising sales terms, and wherein said item is at least one physical item or at least one service item for sale;

counteroffering, by said seller, in response to an offer by said at least one bidder, with new sales terms to said at least one bidder, wherein said new sales terms include a new price, said new price being less than a listed ask price in said item data and greater than a bid price in said offer, wherein said offer of said at least one bidder and the counteroffer by said seller are relayed in substantially real-time; and selecting, among said at least one bidder, a buyer of said item at said new sales terms, wherein, in said selecting, if a particular at least one bidder or a different bidder offers terms at or above said new sales terms, the particular or different bidder is selected as the buyer of said item at said terms, wherein communications between said seller and said at least one bidder involve at least one electronic device, wherein said seller, in said counteroffering, employs at least one electronic device to forward said new sales terms to said at least one bidder.

2. The method according to claim 1, wherein said step of counteroffering, at new sales terms, to an offer by said at least one bidder is repeated a plurality of times.

3. The method according to claim 1, wherein, after the step of counteroffering by said seller with new sales terms to said at least one bidder, an offer from a different bidder is received at or above said new sales terms and said different buyer is automatically selected as the buyer of said item at said new sales terms.

4. The method according to claim 1, wherein offers from said at least one bidder to said seller below a minimum value are automatically rejected.

5. The method according to claim 1, further comprising, after the step of selecting, the step of: adding other prospective bidders to a waitlist for said item until said item is conveyed to said buyer.

6. The method according to claim 5, further comprising:
after said item is conveyed to said buyer, removing prospective bidders from said waitlist.

7. The method according to claim 5, further comprising:
adding said item data to a wantlist of desired items for said prospective bidders.

8. The method according to claim 1, wherein said at least one bidder is the first prospective bidder on a waitlist for said item.

9. The method according to claim 1, wherein said at least one bidder has said item data in a wantlist of desired items.

10. The method according to claim 1, wherein, prior to said step of receiving, said item failed to sell at auction and said item was automatically offered for bid.

11. The method according to claim 1, wherein said step of selecting is performed within a time limit.

12. The method according to claim 11, wherein said time limit is determined by a party, said party being selected from the group consisting of at least one of said seller, said at least one bidder, and a negotiation administrator.

13. The method according to claim 1, wherein a negotiation administrator ensures said negotiation and said sale comply with rules, said rules determining allowable item data, and persons permitted to be said seller and said at least one bidder.

14. The method according to claim 13, wherein said seller and said at least one bidder are remote from said negotiation administrator.

15. A computer-implemented method for facilitating the negotiation and sale of an item between a seller and at least one bidder across a network, said seller and said at least one bidder being remote from one another, said method comprising:
receiving, from said at least one bidder, item data about said item and a first offer to purchase said item at first sales terms, said item data comprising sales terms, and wherein said item is at least one physical item or at least one service item for sale; receiving, from said seller, a second offer to sell said item at new sales terms; and
selecting said at least one bidder to buy said item at said new sales terms,
wherein, in said selecting, if a particular at least one bidder or a different bidder offers terms at or above said new sales terms, the particular or different bidder is selected as the buyer of said item at said terms,
wherein said new sales terms in said second offer from said seller includes a price for said item above an original price set by said seller and below a price in said first sales terms from said at least one bidder,
wherein communications between said seller and said at least one bidder involve at least one electronic device,
wherein said seller, in said receiving, employs at least one electronic device to forward said second offer with new sales terms.

16. A computer-implemented method for facilitating the negotiation and sale of an item between a seller and at least one bidder across a network, said seller and said at least one bidder being remote from one another, said method comprising:
receiving, from said seller to said at least one bidder, item data about said item, said item data comprising sales terms, and wherein said item is at least one physical item or at least one service item for sale;
counteroffering, by said seller, in response to an offer by said at least one bidder to said seller, with new sales terms to said at least one bidder,
wherein said new sales terms include a new price, said new price being greater than a bid price in said offer, said bid price being greater than or equal to a listed ask price in said item data, and said offer of said at least one bidder and the counteroffer by said seller being relayed in substantially real-time; and
selecting, among said at least one bidder, a buyer of said item at said new sales terms,
wherein, in said selecting, if a particular at least one bidder or a different bidder offers terms at or above said new sales terms, the particular or different bidder is selected as the buyer of said item at said terms,
wherein communications between said seller and said at least one bidder involve at least one electronic device,
wherein said seller, in said counteroffering, employs at least one electronic device to forward said new sales terms to said at least one bidder.

17. The method according to claim 16, wherein said step of counteroffering, at new sales terms, to an offer by said at least one bidder is repeated a plurality of times.

18. The method according to claim 16, wherein, after the step of counteroffering by said seller with new sales terms to said at least one bidder, an offer from a different bidder is received at or above said new sales terms and said different buyer is automatically selected as the buyer of said item at said new sales terms.

19. The method according to claim 16, further comprising, after the step of selecting, the step of:
adding other prospective bidders to a waitlist for said item until said item is conveyed to said buyer.

20. The method according to claim 19, further comprising:
after said item is conveyed to said buyer, removing prospective bidders from said waitlist.

21. The method according to claim 19, further comprising:
adding said item data to a wantlist of desired items for said prospective bidders.

22. The method according to claim 16, wherein said at least one bidder is the first prospective bidder on a waitlist for said item.

23. The method according to claim 16, wherein said at least one bidder has said item data in a wantlist of desired items.

24. The method according to claim 16, wherein, prior to said receiving, said item failed to sell at auction and said item was automatically offered for bid.

25. The method according to claim 16, wherein said step of selecting is performed within a time limit.

26. The method according to claim 25, wherein said time limit is determined by a party, said party being selected from the group consisting of at least one of said seller, said at least one bidder, and a negotiation administrator.

27. The method according to claim 16, wherein a negotiation administrator ensures said negotiation and said sale comply with rules, said rules determining allowable item data, and persons permitted to be said seller and said at least one bidder.

28. The method according to claim 27, wherein said seller and said at least one bidder are remote from said negotiation administrator.

29. A computer-implemented system for facilitating the negotiation and sale of an item between a seller and at least one bidder across a network, said seller and said at least one bidder being remote from one another, said system comprising:
means for receiving from said seller to said at least one bidder, item data about said item, said item data comprising sales terms, and wherein said item is at least one physical item or at least one service item for sale;
means for counteroffering by said seller, in response to an offer by said at least one bidder to said seller, with new sales terms to said at least one bidder, wherein said new sales terms include a new price, said new price being less than a listed ask price in said item data and greater than a bid price in said offer, and said offer of said at least one bidder and the counteroffer by said seller being relayed in substantially real-time;

means for selecting, among said at least one bidder, a buyer of said item at said new sales terms, wherein, in said means for selecting, if a particular at least one bidder or a different bidder offers terms at or above said new sales terms, the particular or different bidder is selected as the buyer of said item at said terms, wherein said system includes communications means between said seller and said at least one bidder.

30. The system according to claim 29, wherein said step of counteroffering, at new sales terms, to an offer by said at least one bidder is repeated a plurality of times.

31. The system according to claim 29, wherein, after the step of counteroffering by said seller with new sales terms to said at least one bidder, an offer from a different bidder is received at or above said new sales terms and said different buyer is automatically selected as the buyer of said item at said new sales terms.

32. The system according to claim 29, wherein offers from said at least one bidder to said seller below a minimum value are automatically rejected.

33. The system according to claim 29, further comprising: means for adding other prospective bidders to a waitlist for said item until said item is conveyed to said buyer.

34. The system according to claim 33, further comprising: means for removing, after said item is conveyed to said buyer, prospective bidders from said waitlist.

35. The system according to claim 33, further comprising: means for adding said item data to a wantlist of desired items for said prospective bidders.

36. The system according to claim 29, wherein said at least one bidder is the first prospective bidder on a waitlist for said item.

37. The system according to claim 29, wherein said at least one bidder has said item data in a wantlist of desired items.

38. The system according to claim 29, wherein said item failed to sell at an auction and said item was automatically offered for bid.

39. The system according to claim 29, wherein said step of selecting is performed within a time limit.

40. The system according to claim 39, wherein said time limit is determined by a party, said party being selected from the group consisting of at least one of said seller, said at least one bidder, and a negotiation administrator.

41. The system according to claim 29, wherein a negotiation administrator ensures said negotiation and said sale comply with rules, said rules determining allowable item data, and persons permitted to be said seller and said at least one bidder.

42. The system according to claim 41, wherein said seller and said at least one bidder are remote from said negotiation administrator.

43. A system for facilitating the negotiation and sale of an item between a seller and at least one bidder across a network, said seller and said at least one bidder being remote from one another, said system comprising:

means for receiving, from said at least one bidder, item data about said item and a first offer to purchase said item at first sales terms, said item data comprising sales terms, and wherein said item is at least one physical item or at least one service item for sale;

means for receiving from said seller a second offer to sell said item at new sales terms; and means for selecting said at least one bidder to buy said item at said new sales terms;

wherein, in said means for selecting, if a particular at least one bidder or a different bidder offers terms at or above said new sales terms, the particular or different bidder is selected as the buyer of said item at said terms, wherein said new sales terms in said second offer from said seller includes a price for said item above an original price set by said seller and below a price in said first sales terms from said at least one bidder, wherein said system includes communications means between said seller and said at least one bidder.

44. A system for facilitating the negotiation and sale of an item between a seller and at least one bidder across a network, said seller and said at least one bidder being remote from one another, said system comprising:

means for receiving, from said seller to said at least one bidder, item data about said item, said item data comprising sales terms, and wherein said item is at least one physical item or a service item for sale;

means for counteroffering by said seller, in response to an offer by said at least one bidder to said seller, with new sales terms to said at least one bidder, wherein said new sales terms include a new price, said new price being greater than a bid price in said offer, said bid price being greater than or equal to a listed ask price in said item data, and said offer of said at least one bidder and the counteroffer by said seller being relayed in substantially real-time; and means for selecting, among said at least one bidder, a buyer of said item at said new sales terms;

wherein, in said means for selecting, if a particular at least one bidder or a different bidder offers terms at or above said new sales terms, the particular or different bidder is selected as the buyer of said item at said terms, wherein communications between said seller and said at least one bidder involve at least one electronic device.

45. The system according to claim 44, wherein said step of counteroffering, at new sales terms, to an offer by said at least one bidder is repeated a plurality of times.

46. The system according to claim 44, wherein, after the step of counteroffering by said seller with new sales terms to said at least one bidder, an offer from a different bidder is received at or above said new sales terms and said different buyer is automatically selected as the buyer of said item at said new sales terms.

47. The system according to claim 44, further comprising: means for adding other prospective bidders to a waitlist for said item until said item is conveyed to said buyer.

48. The system according to claim 47, further comprising: means for removing, after said item is conveyed to said buyer, prospective bidders from said waitlist.

49. The system according to claim 47, further comprising: means for adding said item data to a wantlist of desired items for said prospective bidders.

50. The system according to claim 44, wherein said at least one bidder is the first prospective bidder on a waitlist for said item.

51. The system according to claim 44, wherein said at least one bidder has said item data in a wantlist of desired items.

52. The system according to claim 44, wherein, prior to said step of receiving, said item failed to sell at auction and said item was automatically offered for bid.

53. The system according to claim 44, wherein said step of selecting is performed within a time limit.

54. The system according to claim 53, wherein said time limit is determined by a party, said party being selected from the group consisting of at least one of said seller, said at least one bidder, and a negotiation administrator.

55. The system according to claim 44, wherein a negotiation administrator ensures said negotiation and said sale comply with rules, said rules determining allowable item data, and persons permitted to be said seller and said at least one bidder.

56. The system according to claim 55, wherein said seller and said at least one bidder are remote from said negotiation administrator.

57. A non-transitory data storage medium with computer-executable instructions thereon for facilitating the negotiation and sale of an item between a seller and at least one bidder across a network, said seller and said at least one bidder being remote from one another, said data storage medium comprising:
  instructions for receiving, from said seller to said at least one bidder, item data about said item, said item data comprising sales terms, and wherein said item is at least one physical item or at least one service item for sale;
  in response to an offer by said at least one bidder to said seller, instructions for counteroffering, by said seller, with new sales terms to said at least one bidder,
  wherein said new sales terms include a new price, said new price being less than a listed ask price in said item data and greater than a bid price in said offer, and said offer of said at least one bidder and the counteroffer by said seller being relayed in substantially real-time; and
  instructions for selecting, among said at least one bidder, a buyer of said item at said new sales terms,
  wherein, in said selecting, if a particular at least one bidder or a different bidder offers terms at or above said new sales terms, the particular or different bidder is selected as the buyer of said item at said terms.

58. A non-transitory data storage medium with computer-executable instructions thereon for facilitating the negotiation and sale of an item between a seller and at least one bidder across a network, said seller and said at least one bidder being remote from one another, said data storage medium comprising:
  instructions for receiving, from said at least one bidder, item data about said item and a first offer to purchase said item at first sales terms, said item data comprising sales terms, and wherein said item is at least one physical item or at least one service item for sale;
  instructions for receiving from said seller a second offer to sell said item at new sales terms; and
  instructions for selecting said at least one bidder to buy said item at said new sales terms,
  wherein, in said selecting, if a particular at least one bidder or a different bidder offers terms at or above said new sales terms, the particular or different bidder is selected as the buyer of said item at said terms;
  wherein said new sales terms in said second offer from said seller includes a price for said item above an original price set by said seller and below a price in said first sales terms from said at least one bidder.

59. A non-transitory data storage medium with computer-executable instructions thereon for facilitating the negotiation and sale of an item between a seller and at least one bidder across a network, said seller and said at least one bidder being remote from one another, said data storage medium comprising:
  instructions for receiving, from said seller to said at least one bidder, item data about said item, said item data comprising sales terms, and wherein said item is at least one physical item or at least one service item for sale;
  in response to an offer by said at least one bidder to said seller, instructions for counteroffering, by said seller, with new sales terms to said at least one bidder,
  wherein said new sales terms include a new price, said new price being greater than a bid price in said offer, said bid price being greater than or equal to a listed ask price in said item data, and said offer of said at least one bidder and the counteroffer by said seller being relayed in substantially real-time; and
  instructions for selecting, among said at least one bidder, a buyer of said item at said new sales terms,
  wherein, in said selecting, if a particular at least one bidder or a different bidder offers terms at or above said new sales terms, the particular or different bidder is selected as the buyer of said item at said terms.

* * * * *